(12) United States Patent
Isowaki et al.

(10) Patent No.: US 8,879,213 B2
(45) Date of Patent: Nov. 4, 2014

(54) MAGNETO-RESISTANCE EFFECT ELEMENT, MAGNETIC HEAD, MAGNETIC HEAD ASSEMBLY, MAGNETIC RECORDING AND REPRODUCING APPARATUS, AND METHOD FOR MANUFACTURING MAGNETO-RESISTANCE EFFECT ELEMENT

(71) Applicant: Kabushiki Kaisha Toshiba, Tokyo (JP)

(72) Inventors: Yousuke Isowaki, Kanagawa-ken (JP); Hitoshi Iwasaki, Tokyo (JP); Masayuki Takagishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/939,799

(22) Filed: Jul. 11, 2013

(65) Prior Publication Data

US 2014/0049857 A1    Feb. 20, 2014

(30) Foreign Application Priority Data

Aug. 16, 2012   (JP) ................................. 2012-180675

(51) Int. Cl.
*G11B 5/39*     (2006.01)
*G11B 5/31*     (2006.01)
*G11B 5/11*     (2006.01)

(52) U.S. Cl.
CPC ............... *G11B 5/11* (2013.01); *G11B 5/3163* (2013.01); *G11B 5/3912* (2013.01); *G11B 5/3932* (2013.01); *G11B 5/398* (2013.01); *G11B 5/112* (2013.01); *G11B 5/3916* (2013.01)

USPC ......................................................... 360/319

(58) Field of Classification Search
USPC ....................................... 360/319, 324–324.2
See application file for complete search history.

(56) References Cited

U.S. PATENT DOCUMENTS

| | | | |
|---|---|---|---|
| 7,177,122 B2 | 2/2007 | Hou et al. | |
| 8,369,048 B2 * | 2/2013 | Miyauchi et al. | 360/319 |
| 8,437,106 B2 * | 5/2013 | Yanagisawa et al. | 360/319 |
| 8,576,518 B1 * | 11/2013 | Zeltser et al. | 360/319 |
| 8,749,926 B1 * | 6/2014 | Le et al. | 360/324.12 |
| 8,760,820 B1 * | 6/2014 | McKinlay et al. | 360/319 |
| 8,780,506 B1 * | 7/2014 | Maat et al. | 360/319 |
| 2011/0051291 A1 | 3/2011 | Miyauchi et al. | |
| 2012/0087045 A1 * | 4/2012 | Yanagisawa et al. | 360/294 |
| 2012/0087046 A1 * | 4/2012 | Yanagisawa et al. | 360/294 |

* cited by examiner

*Primary Examiner* — Will J Klimowicz
(74) *Attorney, Agent, or Firm* — Nixon & Vanderhye, P.C.

(57) ABSTRACT

According to one embodiment, a magneto-resistance effect element includes: a first shield; a second shield; a first side shield layer; a second side shield layer; a stacked body; a first shield guide layer; and a second shield guide layer. The first shield guide layer includes a fifth magnetic layer provided between the first side shield layer and the stacked body. The second shield guide layer includes a sixth magnetic layer provided between the second side shield layer and the stacked body. A distance between the first side shield layer and the first shield guide layer is shorter than a distance between the stacked body and the first shield guide layer. A distance between the second side shield layer and the second shield guide layer is shorter than a distance between the stacked body and the second shield guide layer.

20 Claims, 8 Drawing Sheets

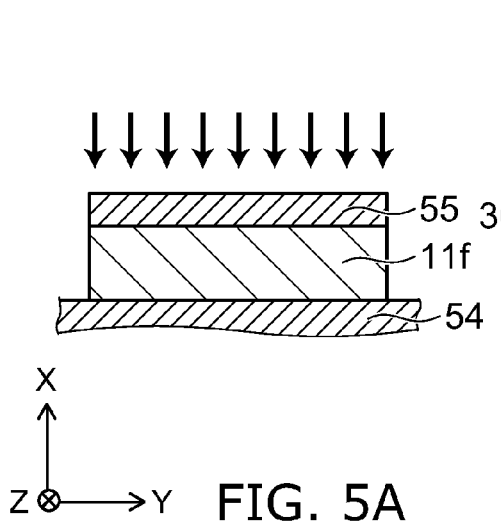
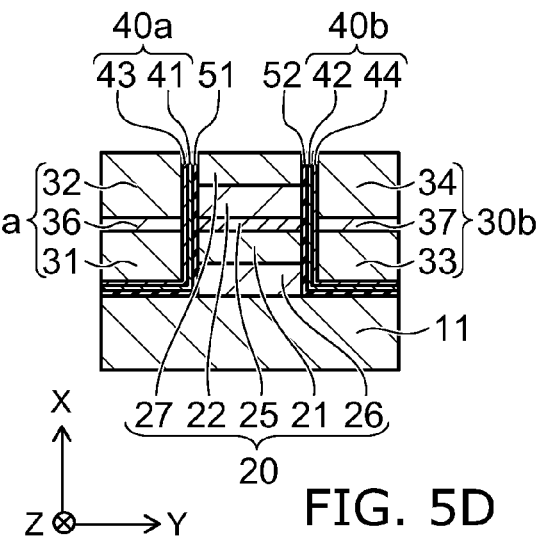
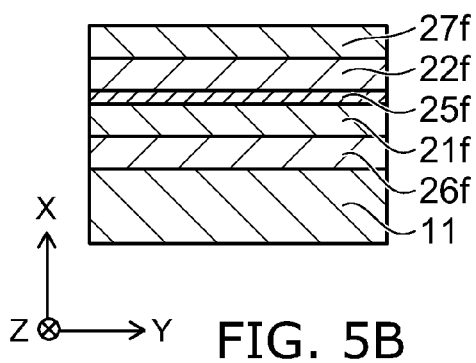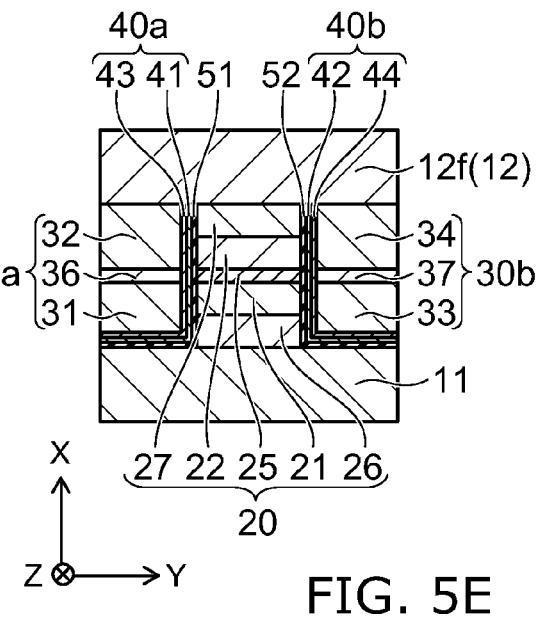
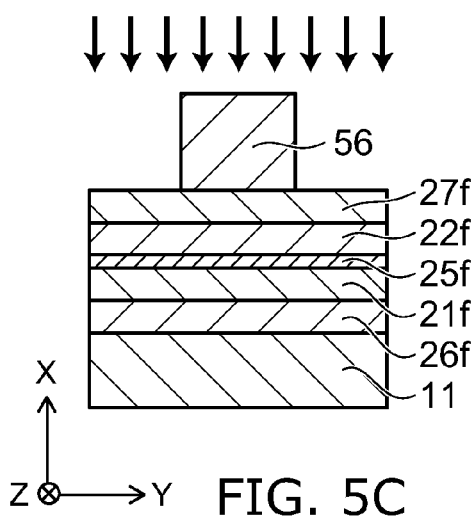
FIG. 5A
FIG. 5B
FIG. 5C
FIG. 5D
FIG. 5E

MAGNETO-RESISTANCE EFFECT ELEMENT, MAGNETIC HEAD, MAGNETIC HEAD ASSEMBLY, MAGNETIC RECORDING AND REPRODUCING APPARATUS, AND METHOD FOR MANUFACTURING MAGNETO-RESISTANCE EFFECT ELEMENT

CROSS-REFERENCE TO RELATED APPLICATIONS

This application is based upon and claims the benefit of priority from the prior Japanese Patent Application No. 2012-180675, filed on Aug. 16, 2012; the entire contents of which are incorporated herein by reference.

FIELD

Embodiments described herein relate generally to a magneto-resistance effect element, a magnetic head, a magnetic head assembly, a magnetic recording and reproducing apparatus, and a method for manufacturing magneto-resistance effect element.

BACKGROUND

For the signal reproduction of a HDD (hard disk drive), for example, a TMR head (tunneling magneto-resistive head) is used. A magneto-resistance effect element provided in the TMR head includes a magnetic stacked film and shields sandwiching the magnetic stacked film. Stabilization of reproduction is desired for the TMR head.

BRIEF DESCRIPTION OF THE DRAWINGS

FIG. 5A to FIG. 5E are schematic cross-sectional views in order of the processes, illustrating a method for manufacturing a magneto-resistance effect element according to the second embodiment;

DETAILED DESCRIPTION

Figure 1:
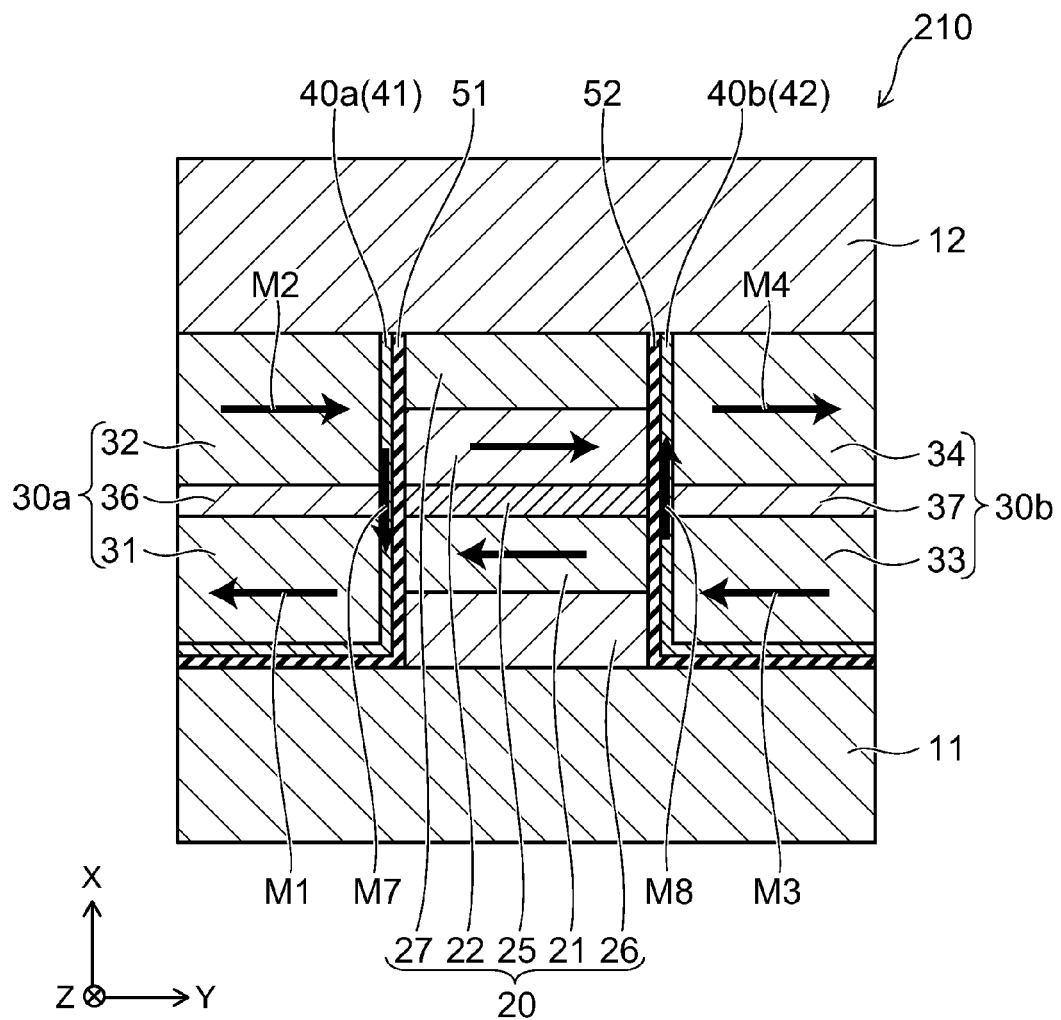
FIG. 1 is a schematic plan view illustrating the configuration of a magneto-resistance effect element according to a first embodiment.

In general, according to one embodiment, a magneto-resistance effect element includes: a first shield; a second shield; a first side shield layer; a second side shield layer; a stacked body; a first shield guide layer; and a second shield guide layer. The first side shield layer includes: a first magnetic layer; a first nonmagnetic intermediate layer; and a second magnetic layer. The first magnetic layer is provided between the first shield and the second shield. The first nonmagnetic intermediate layer is provided between the first magnetic layer and the second shield. The second magnetic layer is provided between the first nonmagnetic intermediate layer and the second shield and antiferromagnetically coupled to the first magnetic layer. The second side shield layer includes: a third magnetic layer; a second nonmagnetic intermediate layer; and a fourth magnetic layer. The third magnetic layer is provided between the first shield and the second shield and away from the first side shield layer in a first direction intersecting with a stacking direction from the first shield toward the second shield. The second nonmagnetic intermediate layer is provided between the third magnetic layer and the second shield and away from the first side shield layer in the first direction. The fourth magnetic layer is provided between the second nonmagnetic intermediate layer and the second shield and away from the first side shield layer in the first direction and antiferromagnetically coupled to the third magnetic layer. The stacked body includes: a first ferromagnetic layer; a third nonmagnetic intermediate layer; and a second ferromagnetic layer. The first ferromagnetic layer is provided between the first side shield layer and the second side shield layer between the first shield and the second shield. The third nonmagnetic intermediate layer is provided between the first ferromagnetic layer and the second shield. The second ferromagnetic layer provided between the third nonmagnetic intermediate layer and the second shield. The first shield guide layer includes a fifth magnetic layer provided between the first side shield layer and the stacked body. The second shield guide layer includes a sixth magnetic layer provided between the second side shield layer and the stacked body. A distance between the first side shield layer and the first shield guide layer is shorter than a distance between the stacked body and the first shield guide layer. A distance between the second side shield layer and the second shield guide layer is shorter than a distance between the stacked body and the second shield guide layer.

Hereinbelow, embodiments are described with reference to the drawings.

The drawings are schematic or conceptual; and the relationships between the thickness and width of portions, the proportions of sizes among portions, etc. are not necessarily the same as the actual values thereof. Further, the dimensions and proportions may be illustrated differently among drawings, even for identical portions.

In the specification of this application and the drawings, components similar to those described in regard to a drawing thereinabove are marked with the same reference numerals, and a detailed description is omitted as appropriate.

First Embodiment

FIG. 1 is a schematic plan view illustrating the configuration of a magneto-resistance effect element according to a first embodiment.

Figure 2:
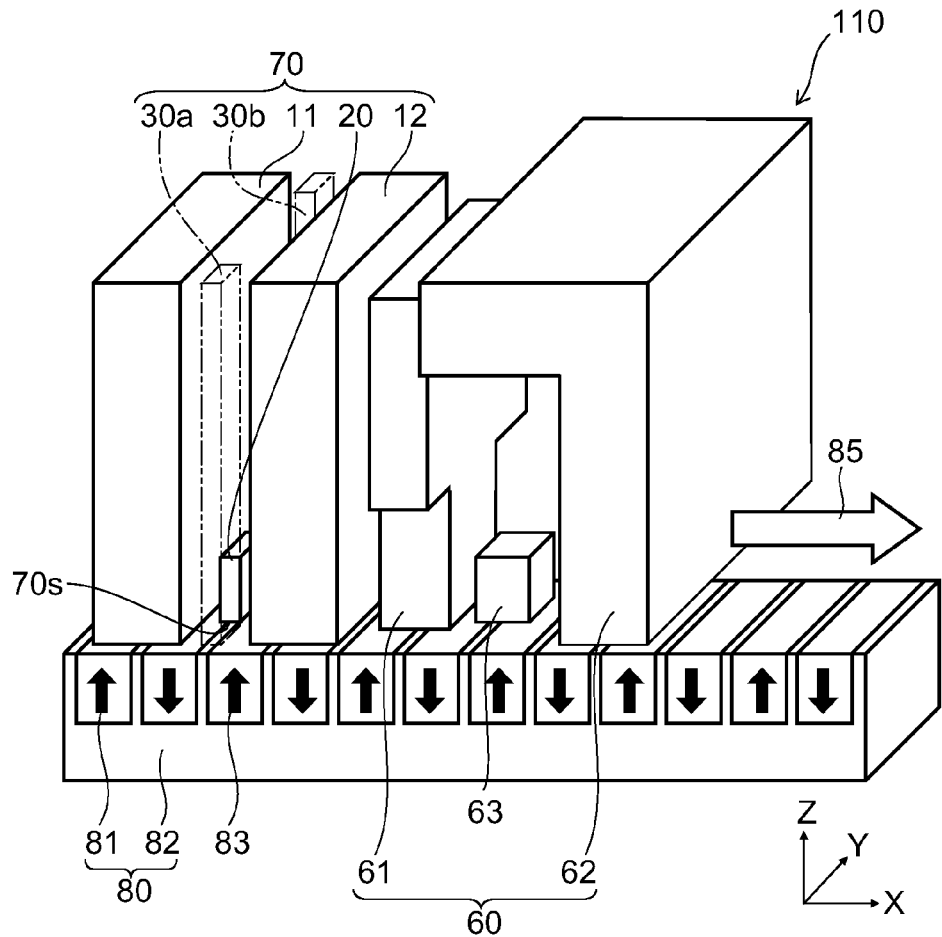
FIG. 2 is a schematic perspective view illustrating the configuration of a magnetic head in which the magneto-resistance effect element according to the first embodiment is mounted.

FIG. 2 is a schematic perspective view illustrating the configuration of a magnetic head in which the magneto-resistance effect element according to the first embodiment is mounted.

Figure 3:
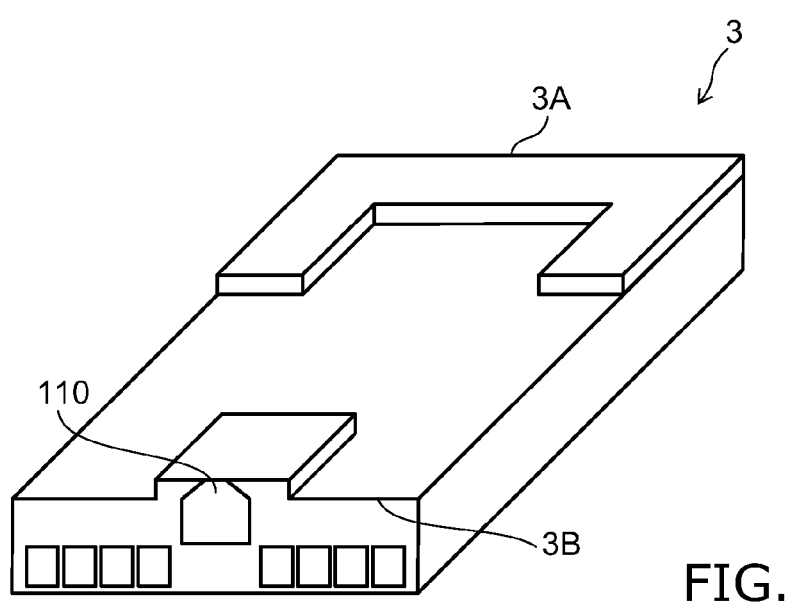
FIG. 3 is a schematic perspective view illustrating the configuration of a head slider in which the magneto-resistance effect element according to the first embodiment is mounted.

FIG. 3 is a schematic perspective view illustrating the configuration of a head slider in which the magneto-resistance effect element according to the first embodiment is mounted.

First, an overview of the configuration and an overview of the operation of the magnetic head according to the embodiment are described with reference to FIG. 2 and FIG. 3.

As shown in FIG. 2, a magnetic head 110 includes a reproducing unit 70 (a reproducing head unit). The magnetic head 110 may further include a writing unit 60 (a writing head unit).

The writing unit 60 includes, for example, a main magnetic pole 61 and a writing unit return path 62. In the magnetic head 110, the writing unit 60 may further include, for example, a portion that assists the writing operation, such as a spin torque oscillator 63 (STO). In the magnetic head 110, the writing unit 60 may have an arbitrary configuration.

The reproducing unit 70 includes, for example, a stacked body 20, a first shield 11, a second shield 12, a first side shield layer 30a, and a second side shield layer 30b. The stacked body 20 is provided between the first shield 11 and the second shield 12.

The components of the reproducing unit 70 mentioned above and the components of the writing unit 60 mentioned above are separated by, for example, a not-shown insulator such as alumina.

As shown in FIG. 3, the magnetic head 110 is mounted in a head slider 3. $Al_2O_3$/TiC or the like, for example, is used for the head slider 3. The head slider 3 moves relative to a magnetic recording medium 80 such as a magnetic disk while flying above or being in contact with the magnetic recording medium 80.

The head slider 3 has, for example, an air inflow side 3A and an air outflow side 3B. The magnetic head 110 is disposed at the side surface on the air outflow side 3B of the head slider 3 or the like. Thereby, the magnetic head 110 mounted in the head slider 3 moves relative to the magnetic recording medium 80 while flying above or being in contact with the magnetic recording medium 80.

As shown in FIG. 2, the magnetic recording medium 80 includes, for example, a medium substrate 82 and a magnetic recording layer 81 provided on the medium substrate 82. The magnetization 83 of the magnetic recording layer 81 is controlled by a magnetic field applied from the writing unit 60, and thereby the writing operation is performed. The magnetic recording medium 80 moves relative to the magnetic head 110 along a medium moving direction 85.

The reproducing unit 70 is disposed to oppose the magnetic recording medium 80. The reproducing unit 70 has a medium facing surface 70s (ABS; air bearing surface) opposed to the magnetic recording medium 80. The magnetic recording medium 80 moves relative to the magnetic head 110 along the medium moving direction 85. The reproducing unit 70 detects the direction of the magnetization 83 of the magnetic recording layer 81. Thereby, the reproducing operation is performed. The reproducing unit 70 detects a recorded signal recorded in the magnetic recording medium 80.

As shown in FIG. 1, a magneto-resistance effect element 210 according to the embodiment includes the first shield 11, the second shield 12, the stacked body 20, the first side shield layer 30a, the second side shield layer 30b, a first shield guide layer 40a, a second shield guide layer 40b, a first insulating layer 51, and a second insulating layer 52.

FIG. 1 corresponds to a plan view of the magneto-resistance effect element 210 as viewed from the medium facing surface 70s.

The direction from the first shield 11 toward the second shield 12 (stacking direction) is defined as an X-axis direction. One direction perpendicular to the X-axis direction is defined as a Y-axis direction. The direction perpendicular to the X-axis direction and the Y-axis direction is defined as a Z-axis direction. The Z-axis direction is the height direction. The X-axis direction corresponds to, for example, the recording track traveling direction (track direction) of the magnetic recording medium 80. The Y-axis direction corresponds to, for example, the recording track width direction (track width direction) of the magnetic recording medium 80. The track width direction defines the bit width.

A direction intersecting with the stacking direction from the first shield 11 toward the second shield 12 (the X-axis direction) is defined as a first direction. In the following, a description is given using the case where the first direction is orthogonal to the stacking direction. It is assumed that the first direction is the Y-axis direction.

A direction intersecting with the stacking direction (the X-axis direction) and the first direction (the Y-axis direction) is defined as a second direction. In the following, a description is given using the case where the second direction is orthogonal to the stacking direction and the first direction. It is assumed that the second direction is the Z-axis direction.

The first side shield layer 30a is provided between the first shield 11 and the second shield 12. The second side shield layer 30b is provided away from the first side shield layer 30a in the Y-axis direction. The stacked body 20 is provided between the first side shield layer 30a and the second side shield layer 30b, between the first shield 11 and the second shield 12.

The first shield guide layer 40a is provided between the first side shield layer 30a and the stacked body 20. As shown in FIG. 1, the first shield guide layer 40a extends up to between the first shield 11 and the first side shield layer 30a. In other words, the first shield guide layer 40a is provided between the first side shield layer 30a and the stacked body 20 and between the first shield 11 and the first side shield layer 30a. The first shield guide layer 40a includes a fifth magnetic layer 41. The fifth magnetic layer 41 is provided between the first side shield layer 30a and the stacked body 20. A soft magnetic material, for example, is used for the fifth magnetic layer 41. The fifth magnetic layer 41 is, for example, a soft magnetic layer.

The second shield guide layer 40b is provided between the second side shield layer 30b and the stacked body 20. As shown in FIG. 1, the second shield guide layer 40b extends up to between the first shield 11 and the second side shield layer 30b. In other words, the second shield guide layer 40b is provided between the second side shield layer 30b and the stacked body 20 and between the first shield 11 and the second side shield layer 30b. The second shield guide layer 40b includes a sixth magnetic layer 42. The sixth magnetic layer 42 is provided between the second side shield layer 30b and the stacked body 20. A soft magnetic material, for example, is used for the sixth magnetic layer 42. The second magnetic layer 42 is, for example, a soft magnetic layer.

The existence of the first shield guide layer 40a and the second shield guide layer 40b can be assessed by, for example, local energy dispersive X-ray spectrometry based on a cross section observed using TEM (transmission electron microscopy), SEM (scanning electron microscopy), or the like.

The first insulating layer 51 is provided between the first shield guide layer 40a and the stacked body 20. As shown in FIG. 1, the first insulating layer 51 extends up to between the first shield 11 and the first shield guide layer 40a. In other words, the first insulating layer 51 is provided between the first shield guide layer 40a and the stacked body 20 and between the first shield 11 and the first shield guide layer 40a.

The second insulating layer 52 is provided between the second shield guide layer 40b and the stacked body 20. As shown in FIG. 1, the second insulating layer 52 extends up to between the first shield 11 and the second shield guide layer 40b. In other words, the second insulating layer 52 is provided between the second shield guide layer 40b and the stacked body 20 and between the first shield 11 and the second shield guide layer 40b.

The first side shield layer 30a includes a first magnetic layer 31, a second magnetic layer 32, and a first nonmagnetic intermediate layer 36. The first magnetic layer 31 is provided between the first shield 11 and the second shield 12. The first nonmagnetic intermediate layer 36 is provided between the first magnetic layer 31 and the second shield 12. The second magnetic layer 32 is provided between the first nonmagnetic intermediate layer 36 and the second shield 12. The first magnetic layer 31 is antiferromagnetically coupled to the second magnetic layer 32. A soft magnetic material, for example, is used for the first magnetic layer 31 and the second magnetic layer 32. The first magnetic layer 31 and the second magnetic layer 32 are, for example, soft magnetic layers.

The second side shield layer 30b includes a third magnetic layer 33, a fourth magnetic layer 34, and a second nonmagnetic intermediate layer 37. The third magnetic layer 33 is provided between the first shield 11 and the second shield 12. The second nonmagnetic intermediate layer 37 is provided between the third magnetic layer 33 and the second shield 12. The fourth magnetic layer 34 is provided between the second nonmagnetic intermediate layer 37 and the second shield 12. The third magnetic layer 33 is antiferromagnetically coupled to the fourth magnetic layer 34. A soft magnetic material, for example, is used for the third magnetic layer 33 and the fourth magnetic layer 34. The third magnetic layer 33 and the fourth magnetic layer 34 are, for example, soft magnetic layers. The third ferromagnetic layer 33 is away from the first side shield layer 30a in the Y-axis direction. The fourth magnetic layer 34 is away from the first side shield layer 30a in the Y-axis direction. The second nonmagnetic intermediate layer 37 is away from the first side shield layer 30a in the Y-axis direction.

The stacked body 20 includes a first ferromagnetic layer 21, a second ferromagnetic layer 22, a third nonmagnetic intermediate layer 25, an underlayer 26, and a cap layer 27. The underlayer 26 is provided between the first shield 11 and the second shield 12. The first ferromagnetic layer 21 is provided between the underlayer 26 and the second shield 12. The third nonmagnetic intermediate layer 25 is provided between the first ferromagnetic layer 21 and the second shield 12. The second ferromagnetic layer 22 is provided between the third nonmagnetic intermediate layer 25 and the second shield 12. The cap layer 27 is provided between the second ferromagnetic layer 22 and the second shield 12. The first ferromagnetic layer 21 is provided between the first side shield layer 30a and the second side shield layer 30b, between the first shield 11 and the second shield 12.

In the magneto-resistance effect element 210 included in the reproducing unit 70, for example, at least one of the direction of the magnetization of the first ferromagnetic layer 21 and the direction of the magnetization of the second ferromagnetic layer 22 changes in accordance with the medium magnetic field. A current is passed through the stacked body 20 along the stacking direction of the stacked body 20 to detect a recorded signal from the magnetic recording medium 80. Thereby, the reproducing unit 70 performs the reproducing operation. In the embodiment, the current is supplied to the stacked body 20 via the first shield 11 and the second shield 12. The first shield 11 and the second shield 12 function as electrodes.

A not-shown hard bias is provided between the first shield 11 and the second shield 12 and between the first side shield layer 30a and the second side shield layer 30b on the stacked body 20 (in the Z-axis direction). That is, the hard bias is provided on the opposite side of the stacked body 20 from the medium facing surface 70s. A hard magnetic substance, for example, is used as the hard bias. The hard bias applies a magnetic field to the stacked body 20 to set the magnetization of the first ferromagnetic layer 21 and the second ferromagnetic layer 22 to a prescribed direction.

A magnetic substance is used as the first shield 11 and the second shield 12. The first shield 11 and the second shield 12 contain, for example, a ferromagnetic substance. At least one of the first shield 11 and the second shield 12 contains, for example, at least one material selected from the group consisting of NiFe, CoZrTa, CoZrNb, CoZrNbTa, CoZrTaCr, and CoZrFeCr. A stacked film including a plurality of stacked layers containing at least one material selected from these materials may be used as at least one of the first shield 11 and the second shield 12. NiFe, for example, is used as at least one of the first shield 11 and the second shield 12.

The material and configuration of the first shield 11 may be the same as or different from those of the second shield 12.

As the underlayer 26, for example, at least one selected from the group consisting of Ta, Cu, and Ru may be used. Also a stacked film including a plurality of stacked layers containing at least one material selected from these materials may be used as the underlayer 26. The thickness (the length in the stacking direction, i.e., the length in the X-axis direction) of the underlayer 26 is, for example, 5 nanometers (nm) or less. In the case where a stacked film is used as the underlayer 26, the thickness (the length in the X-axis direction) of each layer included in the stacked film is preferably 3 nm or less. As the underlayer 26, for example, a stacked film (Ta/Cu) in which a layer containing tantalum (Ta) with a thickness of 2 nm and a layer containing copper (Cu) with a thickness of 2 nm are stacked may be used.

When the material and thickness mentioned above are used for the underlayer 26, good crystal orientation of the magneto-resistance effect portion (the first ferromagnetic layer 21, the third nonmagnetic intermediate layer 25, and the second ferromagnetic layer 22) is ensured. Thereby, a sufficient magneto-resistance effect is obtained. Thus, high sensitivity reproduction characteristics are obtained.

A ferromagnetic material, for example, is used for the first ferromagnetic layer 21 and the second ferromagnetic layer 22. CoFeGe, for example, is used for the first ferromagnetic layer 21 and the second ferromagnetic layer 22. The first ferromagnetic layer 21 contains, for example, at least one material selected from the group consisting of CoFe, CoFeB, CoFeNi, CoFeSi, CoFeGe, CoFeSiGe, $Co_2MnSi$, $Co_2MnGe$, NiFe, CoFeMnSi, CoFeMnGe, and an Fe oxide ($FeO_x$). Also a stacked film including a plurality of stacked layers containing at least one material selected from these materials may be used as the first ferromagnetic layer 21. The material and configuration of the second ferromagnetic layer 22 may be the same as or different from those of the first ferromagnetic layer 21. For example, CoFe may be used as the first ferromagnetic layer 21, and CoFeSi may be used as the second ferromagnetic layer 22.

The thickness (the length in the X-axis direction) of the first ferromagnetic layer 21 is 9 nm or less, for example approximately 5 nm. The thickness (the length in the X-axis direction) of the second ferromagnetic layer 22 is 9 nm or less, for example approximately 5 nm. By setting the thickness of the first ferromagnetic layer 21 and the second ferromagnetic layer 22 as thin as 9 nm or less, the thickness (the length in the X-axis direction) of the stacked body 20 can be made thin. By thinning the thickness of the stacked body 20, the distance between the first shield 11 and the second shield 12 can be made small, and the recording density of the HDD can be increased.

The thickness of the second ferromagnetic layer 22 may be the same as or different from the thickness of the first ferromagnetic layer 21.

For example, the thickness of the first ferromagnetic layer 21 and the thickness of the second ferromagnetic layer 22 are set so that the ratio between the magnetic volume of the first ferromagnetic layer 21 and the magnetic volume of the second ferromagnetic layer 22 may be near to "1" (e.g. not less than 0.5 and not more than 2). The magnetic volume is the product of the saturation magnetization Ms of the ferromagnetic layer and the volume V of the ferromagnetic layer (Ms·V).

When the thickness of the first ferromagnetic layer 21 or the thickness of the second ferromagnetic layer 22 is larger than 9 nm, it is difficult to put the underlayer 26 and the magneto-resistance effect portion into the space between the first shield 11 and the second shield 12, which space is defined from the surface recording density.

The third nonmagnetic intermediate layer 25 is, for example, a nonmagnetic layer. Cu, for example, is used for the third nonmagnetic intermediate layer 25. The third nonmagnetic intermediate layer 25 contains, for example, at least one material selected from the group consisting of Cu, Ru, Au, Ag, Zn, Ga, $TiO_x$, ZnO, $Al_2O_3$, MgO, InO, SnO, GaN, and tin-doped indium oxide (ITO; indium tin oxide). Also a stacked film including a plurality of stacked layers containing at least one material selected from these materials may be used as the third nonmagnetic intermediate layer 25. The thickness (the length in the X-axis direction) of the third nonmagnetic intermediate layer 25 is 2 nm or less, for example approximately 2 nm.

When the materials mentioned above are used as the first ferromagnetic layer 21, the third nonmagnetic intermediate layer 25, and the second ferromagnetic layer 22, good spin polarizability is obtained. Thereby, high sensitivity reproduction characteristics are obtained.

The cap layer 27 is, for example, a nonmagnetic layer. The cap layer 27 contains, for example, at least one material selected from the group consisting of Cu and Ta. Also a stacked film including a plurality of stacked layers containing at least one material selected from these materials may be used as the cap layer 27. The thickness (the length in the X-axis direction) of the cap layer 27 is 4 nm or less. As the cap layer 27, for example, a stacked film (Cu/Ta) in which a layer containing copper (Cu) with a thickness of 1 nm and a layer containing tantalum (Ta) with a thickness of 2 nm are stacked may be used.

At least one of the first magnetic layer 31 and the second magnetic layer 32 contains, for example, at least one material selected from the group consisting of NiFe, CoZrTa, CoZrNb, CoZrNbTa, CoZrTaCr, and CoZrFeCr. A stacked film including a plurality of stacked layers containing at least one material selected from these materials may be used as at least one of the first magnetic layer 31 and the second magnetic layer 32. The material and configuration of the first magnetic layer 31 may be the same as or different from those of the second magnetic layer 32. For example, NiFe may be used as the first magnetic layer 31, and CoZrNb may be used as the second magnetic layer 32.

At least one of the third magnetic layer 33 and the fourth magnetic layer 34 contains, for example, at least one material selected from the group consisting of NiFe, CoZrTa, CoZrNb, CoZrNbTa, CoZrTaCr, and CoZrFeCr. A stacked film including a plurality of stacked layers containing at least one material selected from these materials may be used as at least one of the third magnetic layer 33 and the fourth magnetic layer 34. The material and configuration of the third magnetic layer 33 may be the same as or different from those of the fourth magnetic layer 34. For example, NiFe may be used as the third magnetic layer 33, and CoZrNb may be used as the fourth magnetic layer 34.

At least one of the first nonmagnetic intermediate layer 36 and the second nonmagnetic intermediate layer 37 contains, for example, at least one material selected from the group consisting of Ru, Cu, Au, and Ag. The thickness (the length in the X-axis direction) of the first nonmagnetic intermediate layer 36 and the thickness (the length in the X-axis direction) of the second nonmagnetic intermediate layer 37 are each 2 nm or less.

The first magnetic layer 31 is exchange-coupled to the second magnetic layer 32. For example, the first magnetic layer 31 is antiferromagnetically coupled to the second magnetic layer 32. When the material mentioned above is used as the first nonmagnetic intermediate layer 36, the antiferromagnetic coupling between the magnetization of the first magnetic layer 31 and the magnetization of the second magnetic layer 32 is ensured based on the RKKY interaction.

The third magnetic layer 33 is exchange-coupled to the fourth magnetic layer 34. For example, the third magnetic layer 33 is antiferromagnetically coupled to the fourth magnetic layer 34. When the material mentioned above is used as the second nonmagnetic intermediate layer 37, the antiferromagnetic coupling between the magnetization of the third magnetic layer 33 and the magnetization of the fourth magnetic layer 34 is ensured based on the RKKY interaction.

The exchange coupling includes, for example, direct joining between a magnetic layer and a magnetic layer. The exchange coupling includes, for example, magnetic coupling between magnetic layers acting via a prescribed ultrathin nonmagnetic layer provided between the magnetic layers, in a plurality of magnetic layers. The exchange coupling is an effect lying across the interface between a magnetic layer and a magnetic layer or the interface between a magnetic layer and a nonmagnetic layer. In the case of lying across the interface between a magnetic layer and a nonmagnetic layer, the exchange coupling depends on the film thickness of the nonmagnetic layer, and acts when the thickness of the nonmagnetic layer is 2 nm or less. The exchange coupling is different from static magnetic field coupling due to a leak magnetic field from the end portion of a magnetic layer.

The exchange coupling energy can be considered as a ferromagnetic coupling bias magnetic field or an antiferromagnetic coupling bias magnetic field acting between magnetic layers. For example, in the case where there is no applied magnetic field bias or the like from the outside, by the exchange coupling action, the directions of the magnetizations of the magnetic layers can be equalized to the same direction (the ferromagnetic coupling state), or can be set to opposite directions (the antiferromagnetic coupling state). In the case where there is an applied magnetic field bias or the like from the outside, the magnetization is directed to the direction determined by the synthesis of the applied magnetic field bias magnetic field from the outside and the bias magnetic field due to the exchange coupling. Thus, although the direction of the bias magnetic field due to the exchange coupling and the directions of the magnetizations of the magnetic layers do not necessarily agree, the ferromagnetic coupling bias magnetic field components or the antiferromagnetic coupling magnetic field components due to the exchange coupling act. In the case where a hard bias is provided, there is also a bias magnetic field due to the hard bias in addition to the bias magnetic field due to the exchange coupling.

As the fifth magnetic layer 41 and the sixth magnetic layer 42, for example, a soft magnetic material is used. At least one of the fifth magnetic layer 41 and the sixth magnetic layer 42 contains, for example, at least one material selected from the group consisting of NiFe, CoZrTa, CoZrNb, CoZrNbTa, CoZrTaCr, CoZrFeCr, and CoFe. Also a stacked film including a plurality of stacked layers containing at least one material selected from these materials may be used as at least one of the fifth magnetic layer 41 and the sixth magnetic layer 42. Also a shield material, for example, may be used as the fifth magnetic layer 41 and the sixth magnetic layer 42.

The thickness of the fifth magnetic layer 41 is not less than 1 nm and not more than 5 nm. The thickness of the fifth magnetic layer 41 is the thickness in the first direction (i.e., the length in the Y-axis direction) of a portion of the fifth magnetic layer 41 between the stacked body 20 and the first side shield layer 30a. The thickness of the sixth magnetic layer 42 is not less than 1 nm and not more than 5 nm. The thickness of the sixth magnetic layer 42 is the thickness in the first direction (i.e., the length in the Y-axis direction) of a portion of the sixth magnetic layer 42 between the stacked body 20 and the second side shield layer 30b.

If the thickness of the fifth magnetic layer 41 and the thickness of the sixth magnetic layer 42 are smaller than 1 nm, soft magnetic properties as a shield guide layer are not obtained. Consequently, a circulating magnetic path is not formed among the first magnetic layer 31, the second magnetic layer 32, and the fifth magnetic layer 41. A circulating magnetic path is not formed among the third magnetic layer 33, the fourth magnetic layer 34, and the sixth magnetic layer 42. Consequently, a leak magnetic field from at least one of the first magnetic layer 31, the second magnetic layer 32, the third magnetic layer 33, and the fourth magnetic layer 34 to at least one of the first ferromagnetic layer 21 and the second ferromagnetic layer 22 is generated. This causes destabilization of the first ferromagnetic layer 21 and the second ferromagnetic layer 22. Thus, it is not preferable.

If the thickness of the fifth magnetic layer 41 is larger than 5 nm, a circulating path magnetic field is formed among the first magnetic layer 31, the second magnetic layer 32, and the fifth magnetic layer 41. If the thickness of the sixth magnetic layer 42 is larger than 5 nm, a circulating path magnetic field is formed among the third magnetic layer 33, the fourth magnetic layer 34, and the sixth magnetic layer 42. However, irregular magnetic domains are formed in a side surface of the fifth magnetic layer 41 that is between the stacked body 20 and the first side shield layer 30a and is in contact with the first insulating layer 51. Irregular magnetic domains are formed in a side surface of the sixth magnetic layer 42 that is between the stacked body 20 and the second side shield layer 30b and is in contact with the second insulating layer 52. Consequently, a leak magnetic field from the first shield guide layer 40a itself to at least one of the first ferromagnetic layer 21 and the second ferromagnetic layer 22 is generated in a small amount. A leak magnetic field from the second shield guide layer 40b itself to at least one of the first ferromagnetic layer 21 and the second ferromagnetic layer 22 is generated in a small amount. However, the influence thereof is smaller than the influence of the leak magnetic field from the first side shield layer 30a to the first ferromagnetic layer 21 and the second ferromagnetic layer 22. The influence thereof is smaller than the influence of the leak magnetic field from the second side shield layer 30b to the first ferromagnetic layer 21 and the second ferromagnetic layer 22. Therefore, the first shield guide layer 40a and the second shield guide layer 40b stabilize the first ferromagnetic layer 21 and the second ferromagnetic layer 22. However, the degree of stabilization is slightly reduced.

The first insulating layer 51 and the second insulating layer 52 contain, for example, at least one material selected from the group consisting of $SiO_2$ and $Al_2O_3$. The thickness of the first insulating layer 51 is, for example, 5 nm or less. The thickness of the first insulating layer 51 is the thickness in the first direction (i.e., the length in the Y-axis direction) of a portion of the first insulating layer 51 between the stacked body 20 and the first side shield layer 30a. The thickness of the second insulating layer 52 is, for example, 5 nm or less. The thickness of the second insulating layer 52 is the thickness in the first direction (i.e., the length in the Y-axis direction) of a portion of the second insulating layer 52 between the stacked body 20 and the second side shield layer 30b. When the material and thickness mentioned above are used for the first insulating layer 51, the stacked body 20 can be electrically insulated from the first side shield layer 30a in a stable manner. When the material and thickness mentioned above are used for the second insulating layer 52, the stacked body 20 can be electrically insulated from the second side shield layer 30b in a stable manner. Thereby, a short circuit of current between the stacked body 20 and the first side shield layer 30a or between the stacked body 20 and the second side shield layer 30b can be prevented.

Characteristics of the magneto-resistance effect element according to the embodiment will now be described with comparison to reference examples.

In a magneto-resistance effect element according to a first reference example, the first shield guide layer 40a and the second shield guide layer 40b are not provided. Otherwise, the configuration of the magneto-resistance effect element according to the first reference example is similar to the configuration of the magneto-resistance effect element 210.

In a magneto-resistance effect element according to a second reference example, the first shield guide layer 40a and the second shield guide layer 40b are not provided. The first side shield layer 30a includes the first magnetic layer 31. In the first side shield layer 30a, the first nonmagnetic intermediate layer 36 and the second magnetic layer 32 are not provided. The second side shield layer 30b includes the third magnetic layer 33. In the second side shield layer 30b, the second nonmagnetic intermediate layer 37 and the fourth magnetic layer 34 are not provided. Otherwise, the configuration of the magneto-resistance effect element according to the second reference example is similar to the configuration of the magneto-resistance effect element 210.

As described in regard to FIG. 1, at least one of the direction of the magnetization of the first ferromagnetic layer 21 and the direction of the magnetization of the second ferromagnetic layer 22 changes in accordance with the medium magnetic field. In such a magneto-resistance effect element, bias magnetic field components of antiferromagnetic coupling act between the magnetization of the first ferromagnetic layer 21 and the magnetization of the second ferromagnetic layer 22 due to static magnetic field coupling, antiferromagnetic exchange coupling, etc. The static magnetic field coupling acts between the first ferromagnetic layer 21 and the second ferromagnetic layer 22. The antiferromagnetic exchange coupling acts between the first ferromagnetic layer 21 and the second ferromagnetic layer 22 by utilizing the third nonmagnetic intermediate layer 25. Thereby, the balance of the bias magnetic field components of antiferromagnetic coupling is kept between the first ferromagnetic layer 21 and the second ferromagnetic layer 22.

However, in the magneto-resistance effect element according to the first reference example and the magneto-resistance effect element according to the second reference example, due to a leak magnetic field from the first side shield layer 30a and the second side shield layer 30b, the balance of the bias magnetic field components of antiferromagnetic coupling applied to the first ferromagnetic layer 21 and the second ferromagnetic layer 22 is broken. Consequently, the first ferromagnetic layer 21 and the second ferromagnetic layer 22 become unstable.

If the first ferromagnetic layer 21 and the second ferromagnetic layer 22 have become unstable, the magnetization of the first ferromagnetic layer 21 and the magnetization of the second ferromagnetic layer 22 are likely to be fixed to each other in an antiparallel magnetization state. Consequently, the signal intensity and the linear responsiveness are degraded. If the signal intensity is reduced, the output signal S/N is degraded. A magneto-resistance effect element with a degraded output signal S/N cannot be used for a reproducing head.

In the magneto-resistance effect element according to the first reference example, there is a case where the leak magnetic field from the first side shield layer 30a and the second side shield layer 30b can, by being set to a prescribed magnetization direction, be utilized as bias magnetic field components of antiferromagnetic coupling to the first ferromagnetic layer 21 and the second ferromagnetic layer 22. However, it is when the height of the third nonmagnetic intermediate layer 25 of the stacked body 20 is the same as the height of the first nonmagnetic intermediate layer 36 of the first side shield layer 30a and the height of the second nonmagnetic intermediate layer 37 of the second side shield layer 30b that the balance of the bias magnetic field components of antiferromagnetic coupling applied to the first ferromagnetic layer 21 and the second ferromagnetic layer 22 is kept.

In view of the actual mass production processes, the stacked body 20 does not necessarily have a vertical side surface but may have a certain level of gradient. There is a variation in the shape of the stacked body 20. In such actual mass production processes, it is difficult to make the height of the third nonmagnetic intermediate layer 25 of the stacked body 20 the same as the height of the first nonmagnetic intermediate layer 36 of the first side shield layer 30a and the height of the second nonmagnetic intermediate layer 37 of the second side shield layer 30b. Therefore, in the magneto-resistance effect element according to the first reference example, the height of the third nonmagnetic intermediate layer 25 of the stacked body 20 is not the same as the height of the first nonmagnetic intermediate layer 36 of the first side shield layer 30a and the height of the second nonmagnetic intermediate layer 37 of the second side shield layer 30b. In this case, unevenness (imbalance) occurs in the strength of the bias magnetic field overall applied to the first ferromagnetic layer 21 and the second ferromagnetic layer 22. Consequently, the first ferromagnetic layer 21 and the second ferromagnetic layer 22 become unstable.

In the magneto-resistance effect element according to the second reference example, even when the variation in mass production processes and the like are taken into consideration, the leak magnetic field applied to the first ferromagnetic layer 21 and the second ferromagnetic layer 22 is substantially uniform. However, when the bias magnetic field overall applied to the first ferromagnetic layer 21 and the second ferromagnetic layer 22 including the static magnetic field coupling is taken into consideration, there is unevenness (imbalance) in the strength of the bias magnetic field applied to the first ferromagnetic layer 21 and the second ferromagnetic layer 22. Also in this case, the first ferromagnetic layer 21 and the second ferromagnetic layer 22 become unstable.

In contrast, the magneto-resistance effect element 210 according to the embodiment includes the first shield guide layer 40a. The first shield guide layer 40a is provided between the first side shield layer 30a and the stacked body 20. The distance between the first side shield layer 30a and the first shield guide layer 40a is shorter than the distance between the stacked body 20 and the first shield guide layer 40a. In other words, the first side shield layer 30a is magnetically coupled to the fifth magnetic layer 41 of the first shield guide layer 40a.

Thereby, a closed circulating magnetic path is formed among the first magnetic layer 31, the second magnetic layer 32, and the first shield guide layer 40a, as illustrated by the magnetization M1 of the first magnetic layer 31, the magnetization M2 of the second magnetic layer 32, and the magnetization M7 of the first shield guide layer 40a shown in FIG. 1. Therefore, the leak magnetic field applied from the first side shield layer 30a to the first ferromagnetic layer 21 and the second ferromagnetic layer 22 can be suppressed. Consequently, the destabilization of the first ferromagnetic layer 21 and the second ferromagnetic layer 22 can be suppressed. Thus, a larger signal intensity and a better linear responsiveness are obtained as a reproducing head.

In the magneto-resistance effect element 210 shown in FIG. 1, the first shield guide layer 40a is in contact with the first side shield layer 30a. Thereby, a closed circulating magnetic path is formed more surely among the first magnetic layer 31, the second magnetic layer 32, and the first shield guide layer 40a.

The magneto-resistance effect element 210 according to the embodiment includes the second shield guide layer 40b. The second shield guide layer 40b is provided between the second side shield layer 30b and the stacked body 20. The distance between the second side shield layer 30b and the second shield guide layer 40b is shorter than the distance between the stacked body 20 and the second shield guide layer 40b. In other words, the second side shield layer 30b is magnetically coupled to the sixth magnetic layer 42 of the second shield guide layer 40b.

Thereby, a closed circulating magnetic path is formed among the third magnetic layer 33, the fourth magnetic layer 34, and the second shield guide layer 40b, as illustrated by the magnetization M3 of the third magnetic layer 33, the magnetization M4 of the fourth magnetic layer 34, and the magnetization M8 of the second shield guide layer 40b shown in FIG. 1. Therefore, the leak magnetic field applied from the second side shield layer 30b to the first ferromagnetic layer 21 and the second ferromagnetic layer 22 can be suppressed. Consequently, the destabilization of the first ferromagnetic layer 21 and the second ferromagnetic layer 22 can be suppressed. Thus, a larger signal intensity and a better linear responsiveness are obtained as a reproducing head.

In the magneto-resistance effect element 210 shown in FIG. 1, the second shield guide layer 40b is in contact with the second side shield layer 30b. Thereby, a closed circulating magnetic path is formed more surely among the third magnetic layer 33, the fourth magnetic layer 34, and the second shield guide layer 40b.

With future increases in the recording density of HDDs etc., currently the narrowing of the spacing between upper and lower shields and the miniaturization of reproducing elements are being made. For example, when a surface recording density of 2 terabits per square inch area (2 Tb/inch$^2$) is achieved, the spacing between upper and lower shields is 20 nm or less and the width of the reproducing element is approximately 20 nm or less. In this case, for example, a TMR element unit including an antiferromagnetic layer (an IrMn alloy), a magnetization fixed layer, an intermediate insulating layer, and a magnetization free layer is disposed between upper and lower shields with a spacing of 20 nm or less. The thicknesses of the layers mentioned above are set to a certain value or more in order to bring out appropriate characteristics. Hence, it is difficult to dispose the TMR element unit mentioned above between upper and lower shields with a narrow spacing like the above.

For example, in a conventional TMR head, a hard bias that applies a bias magnetic field to the free layer is disposed on both sides in the track width direction of the reproducing element unit. On the other hand, in a trilayer-type reproducing element, a hard bias is disposed on surfaces of two free layers on the opposite side to the ABS surface. Therefore, in the trilayer-type reproducing element, it is possible to provide side shields on both sides in the track width direction of the reproducing element unit. Thereby, the signal magnetic field from an adjacent track can be blocked. Therefore, in the trilayer-type reproducing element, the resolution in the track width direction can be expected to be improved as compared to conventional TMR heads.

However, in this configuration, as mentioned above, the balance of the bias magnetic field components of antiferromagnetic coupling applied to the magnetization free layer is broken due to a leak magnetic field from the side shield, and the magnetization free layer becomes unstable.

In the embodiment, for example, such instability can be suppressed. By the operation of the magnetization free layer being stabilized, the degradation in the signal intensity is suppressed, and the degradation in the linear responsiveness is suppressed. Since a large signal intensity is obtained, a reproducing head in which the output signal S/N is significantly improved is obtained.

Second Embodiment

Figure 4:
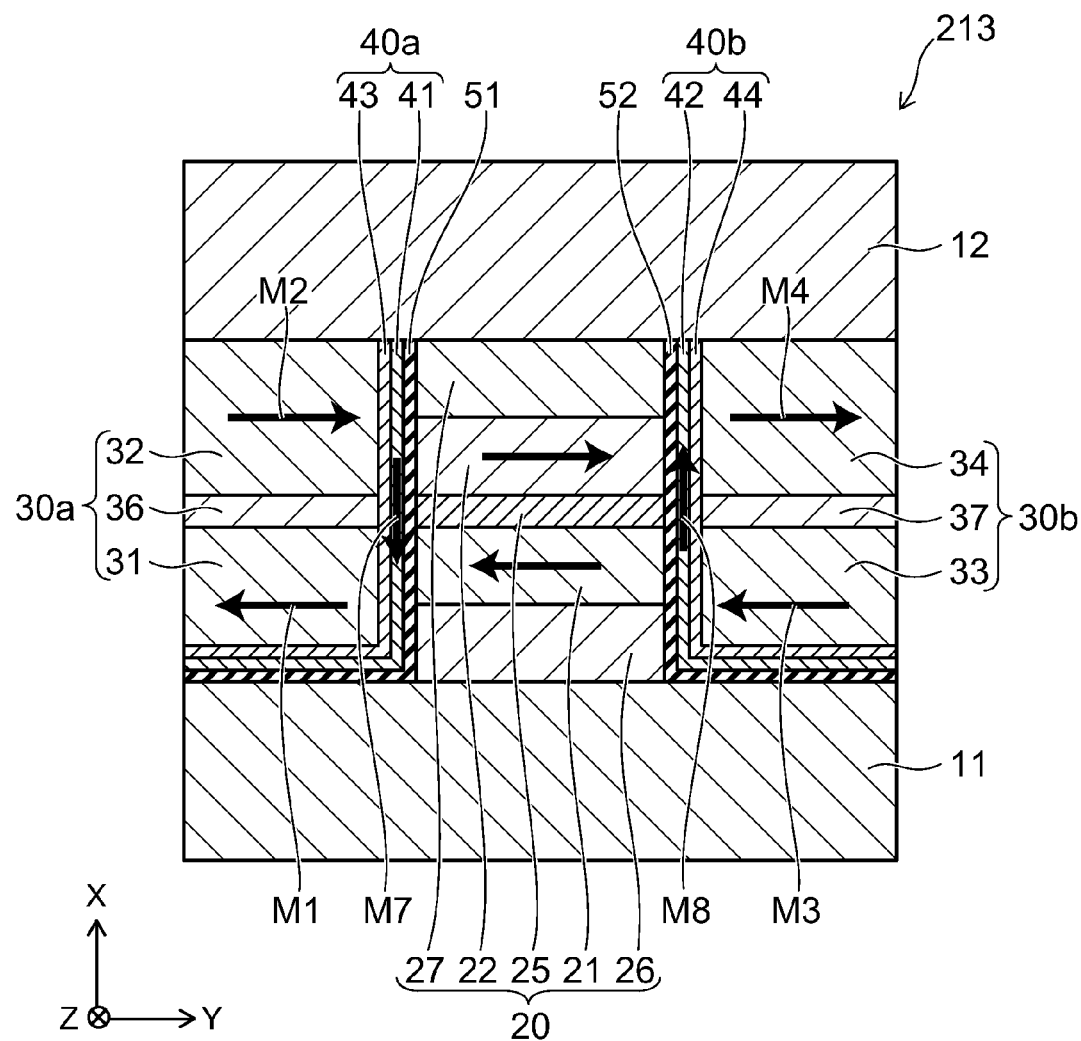
FIG. 4 is a schematic plan view illustrating the configuration of a magneto-resistance effect element according to a second embodiment.

FIG. 4 is a schematic plan view illustrating the configuration of a magneto-resistance effect element according to a second embodiment.

FIG. 4 corresponds to a plan view of a magneto-resistance effect element 213 according to the embodiment as viewed from the medium facing surface 70s.

The first shield guide layer 40a of the embodiment further includes a first nonmagnetic layer 43 as compared to the first shield guide layer 40a of the first embodiment. In other words, the first shield guide layer 40a of the embodiment includes the fifth magnetic layer 41 and the first nonmagnetic layer 43. The first nonmagnetic layer 43 is provided between the first side shield layer 30a and the stacked body 20. The fifth magnetic layer 41 is provided between the first nonmagnetic layer 43 and the stacked body 20. The first insulating layer 51 is provided between the fifth magnetic layer 41 and the stacked body 20.

The second shield guide layer 40b of the embodiment further includes a second nonmagnetic layer 44 as compared to the second shield guide layer 40b of the first embodiment. In other words, the second shield guide layer 40b of the embodiment includes the sixth magnetic layer 42 and the second nonmagnetic layer 44. The second nonmagnetic layer 44 is provided between the second side shield layer 30b and the stacked body 20. The sixth magnetic layer 42 is provided between the second nonmagnetic layer 44 and the stacked body 20. The second insulating layer 52 is provided between the sixth magnetic layer 42 and the stacked body 20.

For the first nonmagnetic layer 43 and the second nonmagnetic layer 44, for example, at least one material selected from the group consisting of Ru, Pt, Cu, Ti, W, Ta, Pd, Al, Si, and Cr may be used. An oxide containing at least one material selected from these materials may be used for the first nonmagnetic layer 43 and the second nonmagnetic layer 44. The thickness of the first nonmagnetic layer 43 is, for example, 5 nm or less. The thickness of the first nonmagnetic layer 43 is the thickness in the first direction (i.e., the length in the Y-axis direction) of a portion of the first nonmagnetic layer 43 between the stacked body 20 and the first side shield layer 30a. The thickness of the second nonmagnetic layer 44 is, for example, 5 nm or less. The thickness of the second nonmagnetic layer 44 is the thickness in the first direction (i.e., the length in the Y-axis direction) of a portion of the second nonmagnetic layer 44 between the stacked body 20 and the second side shield layer 30b.

If the thickness of the first nonmagnetic layer 43 is larger than 5 nm, irregular magnetic domains are formed in a side surface of the fifth magnetic layer 41 that is between the stacked body 20 and the first side shield layer 30a and is in contact with the first insulating layer 51. If the thickness of the second nonmagnetic layer 44 is larger than 5 nm, irregular magnetic domains are formed in a side surface of the sixth magnetic layer 42 that is between the stacked body 20 and the second side shield layer 30b and is in contact with the second insulating layer 52. Consequently, a leak magnetic field from the first shield guide layer 40a itself to at least one of the first ferromagnetic layer 21 and the second ferromagnetic layer 22 is generated in a small amount. A leak magnetic field from the second shield guide layer 40b itself to at least one of the first ferromagnetic layer 21 and the second ferromagnetic layer 22 is generated in a small amount. However, the influence thereof is smaller than the influence of the leak magnetic field from the first side shield layer 30a to the first ferromagnetic layer 21 and the second ferromagnetic layer 22. The influence thereof is smaller than the influence of the leak magnetic field from the second side shield layer 30b to the first ferromagnetic layer 21 and the second ferromagnetic layer 22. Therefore, the first shield guide layer 40a and the second shield guide layer 40b stabilize the first ferromagnetic layer 21 and the second ferromagnetic layer 22. However, the degree of stabilization is slightly reduced. This is similar to the case where the thickness of the fifth magnetic layer 41 and the thickness of the sixth magnetic layer 42 are larger than 5 nm.

Otherwise, the configuration of the magneto-resistance effect element 213 according to the embodiment is similar to the configuration of the magneto-resistance effect element 210.

In the magneto-resistance effect element 213 according to the embodiment, the distance between the first side shield layer 30a and the first shield guide layer 40a is shorter than the distance between the stacked body 20 and the first shield guide layer 40a.

Thereby, a closed circulating magnetic path is formed among the first magnetic layer 31, the second magnetic layer 32, and the first shield guide layer 40a (the fifth magnetic layer 41), as illustrated by the magnetization M1 of the first magnetic layer 31, the magnetization M2 of the second magnetic layer 32, and the magnetization M7 of the first shield guide layer 40a (the fifth magnetic layer 41) shown in FIG. 4.

Therefore, the leak magnetic field applied from the first side shield layer 30a to the first ferromagnetic layer 21 and the second ferromagnetic layer 22 can be suppressed. Consequently, the destabilization of the first ferromagnetic layer 21 and the second ferromagnetic layer 22 can be suppressed. Thus, a larger signal intensity and a better linear responsiveness are obtained as a reproducing head.

In the magneto-resistance effect element 213 according to the embodiment, the distance between the second side shield layer 30b and the second shield guide layer 40b is shorter than the distance between the stacked body 20 and the second shield guide layer 40b.

Thereby, a closed circulating magnetic path is formed among the third magnetic layer 33, the fourth magnetic layer 34, and the second shield guide layer 40b (the sixth magnetic layer 42), as illustrated by the magnetization M3 of the third magnetic layer 33, the magnetization M4 of the fourth magnetic layer 34, and the magnetization M8 of the second shield guide layer 40b (the sixth magnetic layer 42) shown in FIG. 4. Therefore, the leak magnetic field applied from the second side shield layer 30b to the first ferromagnetic layer 21 and the second ferromagnetic layer 22 can be suppressed. Consequently, the destabilization of the first ferromagnetic layer 21 and the second ferromagnetic layer 22 can be suppressed. Thus, a larger signal intensity and a better linear responsiveness are obtained as a reproducing head.

In the magneto-resistance effect element 213 shown in FIG. 4, the first nonmagnetic layer 43 of the first shield guide layer 40a is in contact with the first side shield layer 30a. Thereby, a closed circulating magnetic path is formed more surely among the first magnetic layer 31, the second magnetic layer 32, and the first shield guide layer 40a (the fifth magnetic layer 41).

The second nonmagnetic layer 44 of the second shield guide layer 40b is in contact with the second side shield layer 30b. Thereby, a closed circulating magnetic path is formed more surely among the third magnetic layer 33, the fourth magnetic layer 34, and the second shield guide layer 40b (the sixth magnetic layer 42).

FIG. 5A to FIG. 5E are schematic cross-sectional views in order of the processes, illustrating a method for manufacturing a magneto-resistance effect element according to the second embodiment.

The drawings show a method for manufacturing the magneto-resistance effect element 213.

As shown in FIG. 5A, for example, a substrate 54 is placed in a chamber (not shown). A first shield film 11f that forms the first shield 11 is formed on the substrate 54. The first shield film 11f is formed by, for example, electric plating. After a deposit of the material that forms the first shield film 11f is formed on the substrate 54, for example, the surface of the deposit is ground.

A mask pattern 55 is formed on the first shield film 11f using photoresist technology, and the mask pattern 55 is used as a mask to etch the first shield film 11f, for example. Thereby, the first shield 11 is formed on the substrate 54. Ion beam etching, for example, is used as the etching. After that, the mask pattern 55 is removed.

The interior of the chamber is reduced in pressure (for example, made vacuum), and the upper surface of the first shield 11 is etched with an ion beam. Thereby, the oxidized layer and the contamination layer formed on the upper surface of the first shield 11 are removed. The oxidized layer is, for example, what is formed by exposure to the air after the electric plating and grinding. The contamination layer is, for example, what is attached during the manufacturing processes. The interior of the chamber may be opened to the air after the first shield 11 is formed. At this time, an oxidized layer or a contamination layer caused during manufacturing are attached to the surface of the first shield 11. The oxidized layer or the contamination layer is removed.

In FIG. 5B to FIG. 5E, the illustration of the substrate 54 is omitted.

As shown in FIG. 5B, while the pressure in the chamber is reduced, an underlayer film 26f that forms the underlayer 26 is formed on the first shield 11. Next, a first ferromagnetic film 21f that forms the first ferromagnetic layer 21 is formed on the underlayer film 26f. A third nonmagnetic intermediate film 25f that forms the third nonmagnetic intermediate layer 25 is formed on the first ferromagnetic film 21f. A second ferromagnetic film 22f that forms the second ferromagnetic layer 22 is formed on the third nonmagnetic intermediate film 25f. A cap film 27f that forms the cap layer 27 is formed on the second ferromagnetic film 22f. This processing is performed in a continuous reduced pressure environment. That is, the formation of the underlayer film 26f, the first ferromagnetic film 21f, the third nonmagnetic intermediate film 25f, the second ferromagnetic film 22f, and the cap film 27f is performed without passing through atmospheric pressure.

As shown in FIG. 5C, a mask pattern 56 is formed on the cap film 27f. As the mask pattern 56, for example, a resist mask or a metal mask containing Ta is used. The mask pattern 56 is formed by, for example, using optical lithography technology.

The configuration of the upper surface of the mask pattern 56 defines the width in a direction orthogonal to the stacking direction of the stacked body 20. The mask pattern 56 is slimmed to fashion the upper surface of the mask pattern 56 into a prescribed configuration. For example, the area of the upper surface of the mask pattern 56 is made not less than 9 nm$^2$ and not more than 2500 nm$^2$. For example, each of the widths of the stacked body 20 in the directions orthogonal to the stacking direction is made 20 nm. Thereby, for example, a surface recording density of 2 terabits per square inch area (2 Tb/inch$^2$) is obtained.

As shown in FIG. 5D, the mask pattern 56 is used as a mask to pattern the cap film 27f, the second ferromagnetic film 22f, the third nonmagnetic intermediate film 25f, the first ferromagnetic film 21f, and the underlayer film 26f. Thereby, the stacked body 20 including the underlayer 26, the first ferromagnetic layer 21, the third nonmagnetic intermediate layer 25, the second ferromagnetic layer 22, and the cap layer 27 is formed on the first shield 11.

In the time of etching, there is a case where the whole of the underlayer film 26f is etched, and there is also a case where part of the underlayer film 26f remains. Although the whole of the underlayer film 26f is etched in the example shown in FIG. 5D, part of the underlayer film 26f may remain.

Next, the first insulating layer 51 and the second insulating layer 52 are formed so as to cover the side surface of the stacked body 20 and the upper surface of the first shield 11. Next, the fifth magnetic layer 41 is formed so as to cover the side surface of the stacked body 20 and the upper surface of the first shield 11 via the first insulating layer 51. The sixth magnetic layer 42 is formed so as to cover the side surface of the stacked body 20 and the upper surface of the first shield 11 via the second insulating layer 52. Next, the first nonmagnetic layer 43 is formed so as to cover the side surface of the stacked body 20 and the upper surface of the first shield 11 via the fifth magnetic layer 41. The second nonmagnetic layer 44 is formed so as to cover the side surface of the stacked body 20 and the upper surface of the first shield 11 via the sixth magnetic layer 42.

The formation of the first insulating layer 51, the second insulating layer 52, the fifth magnetic layer 41, the sixth magnetic layer 42, the first nonmagnetic layer 43, and the second nonmagnetic layer 44 is performed by, for example, using a sputtering apparatus, an ADL (atomic layer deposition) apparatus, or the like. In the case of using a sputtering apparatus, by adjusting the sputtering angle, the stack amount in a direction orthogonal to the stacking direction and the stack amount in the stacking direction are adjusted.

Next, the first magnetic layer 31 is formed on the first nonmagnetic layer 43. The third magnetic layer 33 is formed on the second nonmagnetic layer 44. Next, the first nonmagnetic intermediate layer 36 is formed on the first magnetic layer 31. The second nonmagnetic intermediate layer 37 is formed on the third magnetic layer 33. Next, the second magnetic layer 32 is formed on the first nonmagnetic intermediate layer 36. The fourth magnetic layer 34 is formed on the second nonmagnetic intermediate layer 37. The formation of the first magnetic layer 31, the second magnetic layer 32, the third magnetic layer 33, the fourth magnetic layer 34, the first nonmagnetic intermediate layer 36, and the second nonmagnetic intermediate layer 37 is performed by, for example, using a sputtering apparatus. By adjusting the sputtering angle, the stack amount in the stacking direction is adjusted. The layers of the first insulating layer 51, the second insulating layer 52, the fifth magnetic layer 41, the sixth magnetic layer 42, the first nonmagnetic layer 43, the second nonmagnetic layer 44, the first magnetic layer 31, the second magnetic layer 32, the third magnetic layer 33, the fourth magnetic layer 34, the first nonmagnetic intermediate layer 36, and the second nonmagnetic intermediate layer 37 are deposited also on the remaining mask pattern 56 that is left after the patterning of the stacked body 20 shown in FIG. 5D. The layers deposited on the remaining mask pattern 56 are removed by performing a lift-off process.

Next, as shown in FIG. 5E, a second shield film 12$f$ that forms the second shield 12 is formed on the cap layer 27. The formation of the second shield film 12$f$ is performed without exposure to the air after the ion beam etching of the upper surface of the cap layer 27. Then, the second shield film 12$f$ is patterned to form the second shield 12.

When the second shield film 12$f$ can be formed without exposure to the air after the ion beam etching, other processes may exist between the process illustrated in FIG. 5D and the process illustrated in FIG. 5E. For example, there may be a process of forming a hard bias containing a hard magnetic material etc. before forming the second shield film 12$f$. Also these processes are performed using electric plating, a sputtering apparatus, a grinding apparatus, etc.

Thus, the magneto-resistance effect element 213 is fabricated.

Characteristics of the magneto-resistance effect element 210 and the magneto-resistance effect element 213 will now be described.

The magneto-resistance effect element 210 is fabricated by using the method for manufacturing a magneto-resistance effect element described above in regard to FIG. 5A to FIG. 5E. The underlayer 26 is a stacked film in which a layer containing tantalum (Ta) with a thickness of 2 nm and a layer containing copper (Cu) with a thickness of 2 nm are stacked. Each of the first ferromagnetic layer 21 and the second ferromagnetic layer 22 is a layer containing CoFeGe with a thickness of 5 nm. The third nonmagnetic intermediate layer 25 is a layer containing copper (Cu) with a thickness of 3 nm. The cap layer 27 is a layer containing Ru with a thickness of 1.5 nm. Each of the first insulating layer 51 and the second insulating layer 52 is a layer containing $SiO_2$ with a thickness of 2 nm. Each of the fifth magnetic layer 41 and the sixth magnetic layer 42 is a layer containing NiFe with a thickness of 1.5 nm. Each of the first magnetic layer 31, the second magnetic layer 32, the third magnetic layer 33, and the fourth magnetic layer 34 is a layer containing NiFe with a thickness of 7 nm. Each of the first nonmagnetic intermediate layer 36 and the second nonmagnetic intermediate layer 37 is a layer containing Ru with a thickness of 0.7 nm. Each of the first shield 11 and the second shield 12 contains a material of NiFe. The thickness of each layer is adjusted by adjusting the sputtering time based on the feedback of the length measurement results of a cross-sectional image observed using TEM.

When the cross section is physically observed using TEM or the like, the position at the height of the third nonmagnetic intermediate layer 25 of the stacked body 20 does not agree with the position at the height of the first nonmagnetic intermediate layer 36 of the first side shield layer 30$a$ and the position at the height of the second nonmagnetic intermediate layer 37 of the second side shield layer 30$b$. The position at the height of the third nonmagnetic intermediate layer 25 of the stacked body 20 is lower than the position at the height of the first nonmagnetic intermediate layer 36 of the first side shield layer 30$a$ and the position at the height of the second nonmagnetic intermediate layer 37 of the second side shield layer 30$b$.

A current is passed through the electrode portions (the first shield 11 and the second shield 12) of the magneto-resistance effect element 210. Subsequently, the change in the output voltage for every 100 (Oe) in a range of the external applied magnetic field±600 (oersteds; Oe) is measured by static experiment. Subsequently, the output signal intensity and the linear responsiveness as a reproducing head are found. As the signal output intensity (also called the "signal intensity"), the difference between the output voltage $V_{\rightarrow +600 Oe}$ at the time of +600 (Oe) and the output voltage $V_{\rightarrow -600 Oe}$ at the time of −600 (Oe) ($V_{\rightarrow +600 Oe} - V_{\rightarrow -600 Oe}$) is used. For the linear responsiveness, the value obtained by $(V_{\rightarrow +600 Oe} - V_{\rightarrow -600 Oe})/(V_{\rightarrow +600 Oe} + V_{\rightarrow -600 Oe}) \times 100(\%)$ using the output voltage $V_{\rightarrow +600 Oe}$ at the time of +600 (Oe) and the output voltage $V_{\rightarrow -600 Oe}$ at the time of −600 (Oe) is used as an index. That is, a larger value is preferable as the signal intensity. A value nearer to 0(%) is preferable for the linear responsiveness.

As a result, the signal intensity is 1.6 mV. The linear responsiveness is 10%.

The magneto-resistance effect element 213 is fabricated using the method for manufacturing a magneto-resistance effect element described above in regard to FIG. 5A to FIG. 5E. Each of the first nonmagnetic layer 43 and the second nonmagnetic layer 44 is a layer containing Pt with a thickness of 1.5 nm. Otherwise, the thickness and material of each layer are similar to the thickness and material of each layer of the magneto-resistance effect element 210. The thickness of each layer is adjusted by adjusting the sputtering time based on the feedback of the length measurement results of a cross-sectional image observed using TEM.

When the cross section is physically observed using TEM or the like, the position at the height of the third nonmagnetic intermediate layer 25 of the stacked body 20 does not agree with the position at the height of the first nonmagnetic intermediate layer 36 of the first side shield layer 30$a$ and the position at the height of the second nonmagnetic intermediate layer 37 of the second side shield layer 30$b$.

In the magneto-resistance effect element 213, the signal intensity is 1.7 mV. The linear responsiveness is 11%.

The magneto-resistance effect element according to the first reference example is fabricated based on the method for manufacturing a magneto-resistance effect element described above in regard to FIG. 5A to FIG. 5E. When a cross section is physically observed using TEM or the like, the position at the height of the third nonmagnetic intermediate layer 25 of the stacked body 20 does not agree with the position at the height of the first nonmagnetic intermediate layer 36 of the first side shield layer 30a and the position at the height of the second nonmagnetic intermediate layer 37 of the second side shield layer 30b.

In the magneto-resistance effect element according to the first reference example, the first shield guide layer 40a and the second shield guide layer 40b are not provided. Therefore, it is presumed that there is an imbalance in the strength of the leak magnetic field applied from the first side shield layer 30a and the second side shield layer 30b to the first ferromagnetic layer 21 and the second ferromagnetic layer 22.

As a result, the signal intensity is 0.1 millivolts (mV). The linear responsiveness is 50%. As a barometer of the feasibility of using the magneto-resistance effect element as a reproducing head, the criterion of the signal intensity being 1 mV or more and the linear responsiveness being 20% or less is given. The results for the magneto-resistance effect element according to the first reference example are below the criterion. It is presumed that one cause is that the first ferromagnetic layer 21 and the second ferromagnetic layer 22 have become unstable due to a leak magnetic field from the first side shield layer 30a and the second side shield layer 30b. In other words, it is presumed that one cause is that the magnetization of the first ferromagnetic layer 21 and the magnetization of the second ferromagnetic layer 22 are fixed to each other in an antiparallel magnetization state. Hence, it is difficult to use the magneto-resistance effect element according to the first reference example as a reproducing head.

In the first embodiment and the second embodiment, the signal intensity is improved as compared to the first reference example. In the first embodiment and the second embodiment, the linear responsiveness is improved as compared to the first reference example. It has been found that a larger signal intensity and a better linear responsiveness are obtained as a reproducing head.

Figure 6A:
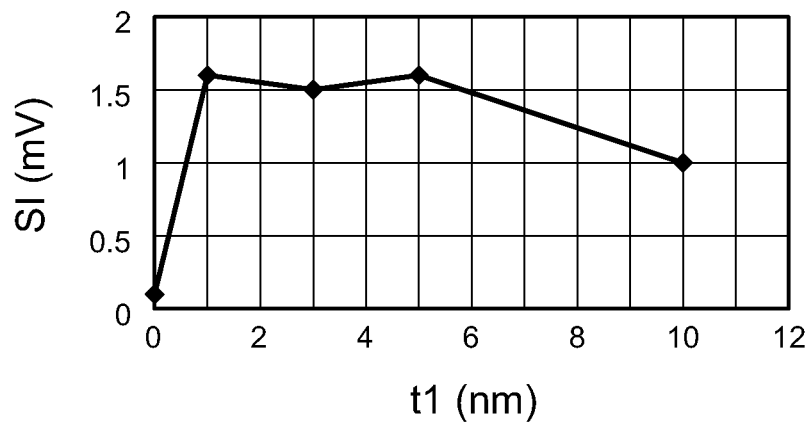
FIG. 6A and FIG. 6B are graphs illustrating characteristics of the fifth magnetic layer and the sixth magnetic layer.
Figure 6B:
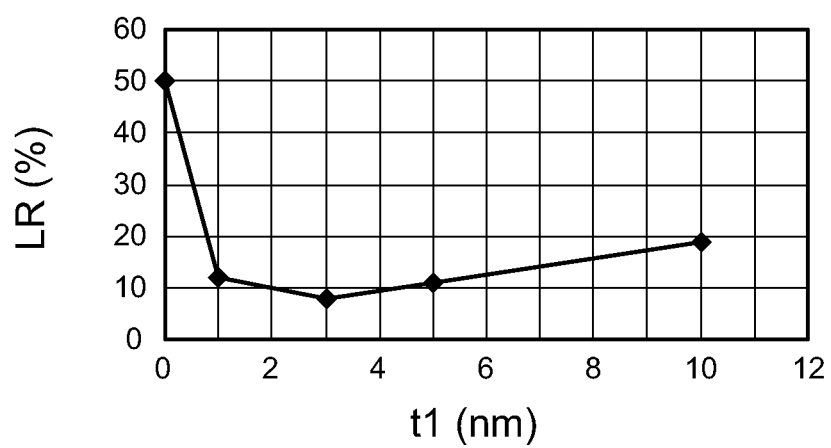

FIG. 6A and FIG. 6B are graphs illustrating characteristics of the fifth magnetic layer and the sixth magnetic layer.

FIG. 6A is a graph illustrating the relationship between the thickness t1 (nm) of each of the fifth magnetic layer 41 and the sixth magnetic layer 42 (the horizontal axis) and the signal intensity SI (mV) (the vertical axis). FIG. 6B is a graph illustrating the relationship between the thickness t1 (nm) of each of the fifth magnetic layer 41 and the sixth magnetic layer 42 (the horizontal axis) and the linear responsiveness LR (%) (the vertical axis).

First, a magneto-resistance effect element is fabricated in which the thickness t1 of each of the fifth magnetic layer 41 and the sixth magnetic layer 42 is made 0 nm, 1 nm, 3 nm, 5 nm, or 10 nm by adjusting the sputtering time. The magneto-resistance effect element in regard to FIG. 6A and FIG. 6B corresponds to the magneto-resistance effect element 210 according to the first embodiment.

The relationship between the position at the height of the third nonmagnetic intermediate layer 25 of the stacked body 20, and the position at the height of the first nonmagnetic intermediate layer 36 of the first side shield layer 30a and the position at the height of the second nonmagnetic intermediate layer 37 of the second side shield layer 30b is similar to the relationship described in regard to characteristics of the magneto-resistance effect element in FIG. 5A to FIG. 5E. The method for measuring (calculating) the signal intensity SI and the linear responsiveness LR is similar to the measurement method (calculation method) described in regard to characteristics of the magneto-resistance effect element in FIG. 5A to FIG. 5E.

FIG. 6A shows results of the signal intensity SI. FIG. 6B shows results of the linear responsiveness LR. According to this, it has been found that a larger signal intensity and a better linear responsiveness are obtained when the thickness t1 of each of the fifth magnetic layer 41 and the sixth magnetic layer 42 is not less than 1 nm and not more than 5 nm.

Figure 7A:
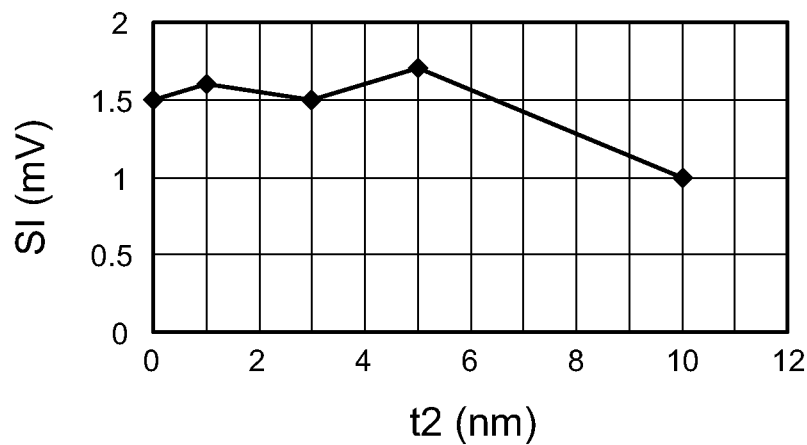
FIG. 7A and FIG. 7B are graphs illustrating characteristics of the first nonmagnetic layer and the second nonmagnetic layer.
Figure 7B:
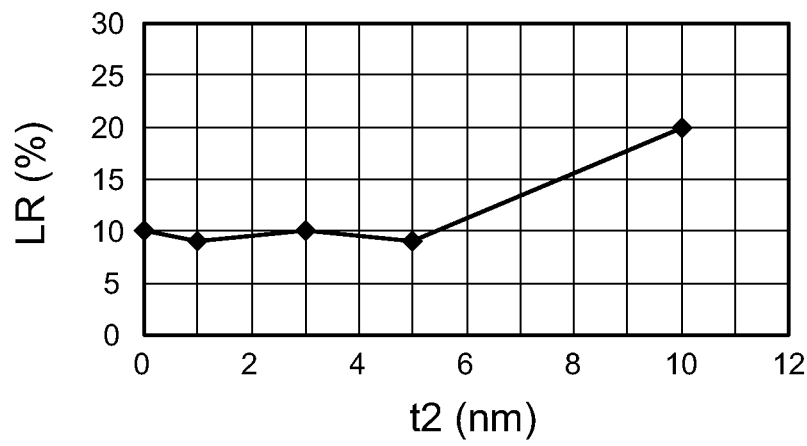

FIG. 7A and FIG. 7B are graphs illustrating characteristics of the first nonmagnetic layer and the second nonmagnetic layer.

FIG. 7A is a graph illustrating the relationship between the thickness t2 (nm) of each of the first nonmagnetic layer 43 and the second nonmagnetic layer 44 (the horizontal axis) and the signal intensity SI (mV) (the vertical axis). FIG. 7B is a graph illustrating the relationship between the thickness t2 (nm) of each of the first nonmagnetic layer 43 and the second nonmagnetic layer 44 (the horizontal axis) and the linear responsiveness LR (%) (the vertical axis).

First, a magneto-resistance effect element is fabricated in which the thickness t2 of each of the first nonmagnetic layer 43 and the second nonmagnetic layer 44 is made 0 nm, 1 nm, 3 nm, 5 nm, or 10 nm by adjusting the sputtering time. The thickness of the first insulating layer 51 is set to 1 nm, 2 nm, 4 nm, 6 nm, and 11 nm for the thicknesses t2 (0 nm, 1 nm, 3 nm, 5 nm, and 10 nm) of each of the first nonmagnetic layer 43 and the second nonmagnetic layer 44, respectively. The thickness of the second insulating layer 52 is set to 1 nm, 2 nm, 4 nm, 6 nm, and 11 nm for the thicknesses t2 (0 nm, 1 nm, 3 nm, 5 nm, and 10 nm) of each of the first nonmagnetic layer 43 and the second nonmagnetic layer 44, respectively. The magneto-resistance effect element in regard to FIG. 7A and FIG. 7B corresponds to the magneto-resistance effect element 213 according to the second embodiment.

The relationship between the position at the height of the third nonmagnetic intermediate layer 25 of the stacked body 20, and the position at the height of the first nonmagnetic intermediate layer 36 of the first side shield layer 30a and the position at the height of the second nonmagnetic intermediate layer 37 of the second side shield layer 30b is similar to the relationship described in regard to characteristics of the magneto-resistance effect element in FIG. 5A to FIG. 5E. The method for measuring (calculating) the signal intensity SI and the linear responsiveness LR is similar to the measurement method (calculation method) described in regard to characteristics of the magneto-resistance effect element in FIG. 5A to FIG. 5E.

FIG. 7A shows results of the signal intensity SI. FIG. 7B shows results of the linear responsiveness LR. According to this, it has been found that a larger signal intensity and a better linear responsiveness are obtained when the thickness t2 of each of the first nonmagnetic layer 43 and the second nonmagnetic layer 44 is 5 nm or less.

Third Embodiment

Figure 8:
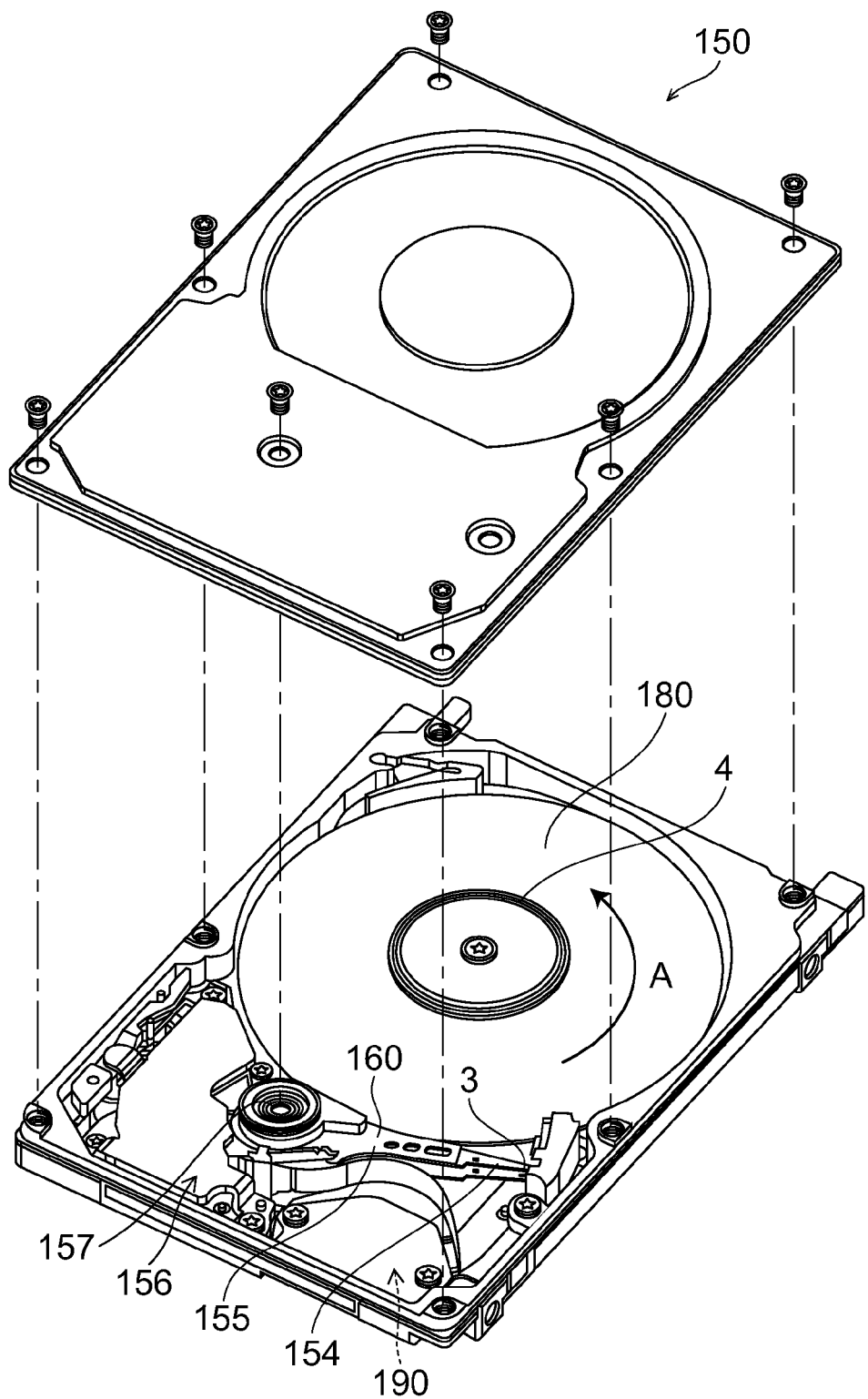
FIG. 8 is a schematic perspective view illustrating the configuration of a magnetic recording and reproducing apparatus according to a third embodiment.

FIG. 8 is a schematic perspective view illustrating the configuration of a magnetic recording and reproducing apparatus according to a third embodiment.

Figure 9A:
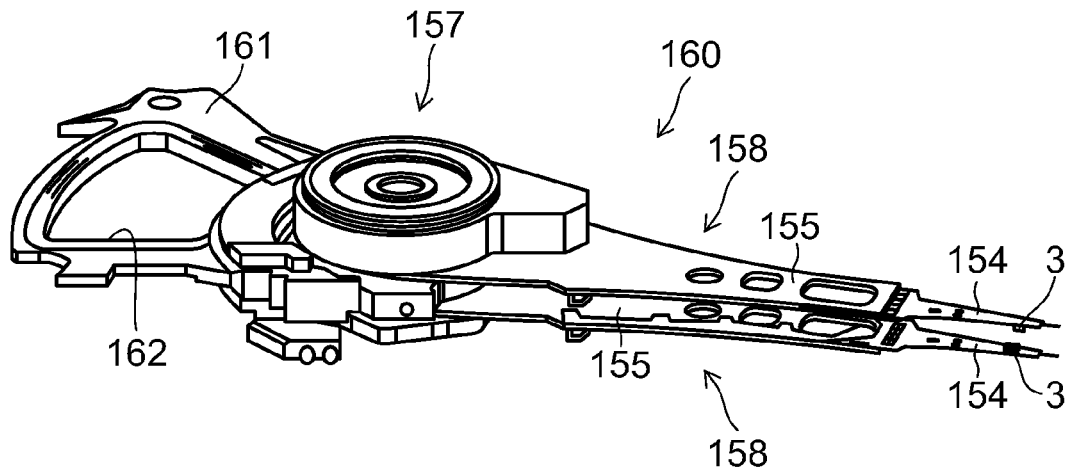
FIG. 9A and FIG. 9B are schematic perspective views illustrating the configuration of part of a magnetic recording apparatus according to the third embodiment.
Figure 9B:
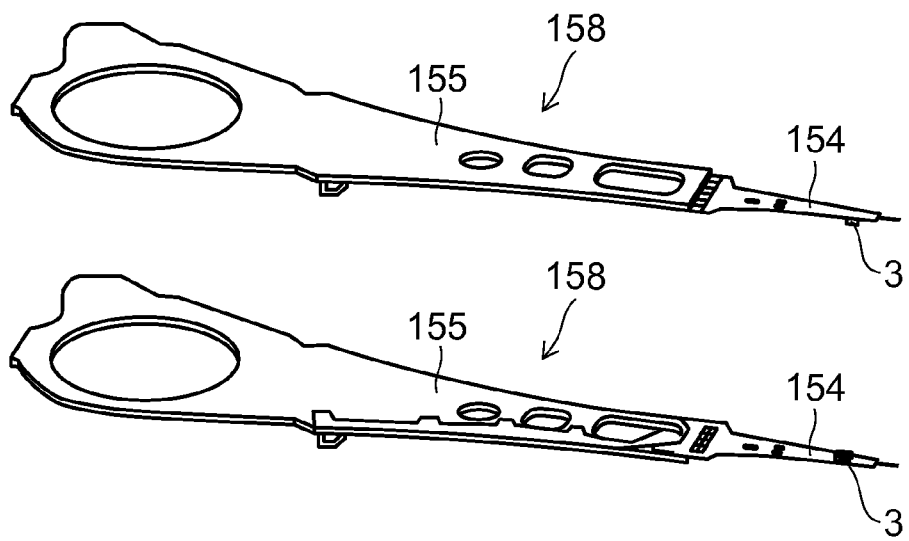

FIG. 9A and FIG. 9B are schematic perspective views illustrating the configuration of part of a magnetic recording apparatus according to the third embodiment.

As shown in FIG. 8, a magnetic recording and reproducing apparatus 150 according to the embodiment is an apparatus of a system using a rotary actuator. A recording medium disk 180 is mounted on a spindle motor 4. The recording medium disk 180 is rotated in the direction of arrow A by a not-shown motor. The motor responds to a control signal from a not-shown driving device control unit, for example. The magnetic recording and reproducing apparatus 150 according to the embodiment may include a plurality of recording medium disks 180.

The recording and reproduction of information stored in the recording medium disk 180 are performed by the head slider 3. The head slider 3 has the configuration illustrated above. The head slider 3 is provided at the tip of a suspension 154. The suspension 154 is in a thin film form. The magnetic head according to the embodiment described above (e.g. the magnetic head 110) or a modification thereof, for example, is mounted near the tip of the head slider 3.

When the recording medium disk 180 rotates, the head slider 3 is held above the surface of the recording medium disk 180. That is, the pressing pressure by the suspension 154 and the pressure generated at the medium facing surface (ABS) of the head slider 3 are balanced. Thereby, the distance between the medium facing surface of the head slider 3 and the surface of the recording medium disk 180 is kept at a prescribed value. In the embodiment, also what is called a "contact-traveling type" may be used in which the head slider 3 is in contact with the recording medium disk 180.

The suspension 154 is connected to one end of an actuator arm 155. The actuator arm 155 includes, for example, a bobbin that holds a not-shown driving coil and the like. A voice coil motor 156 is provided at the other end of the actuator arm 155. The voice coil motor 156 is, for example, a kind of linear motor. The voice coil motor 156 may include, for example, a not-shown driving coil and a magnetic circuit. The driving coil is, for example, wound around the bobbin of the actuator arm 155. The magnetic circuit may include, for example, a not-shown permanent magnet and a not-shown opposed yoke. The permanent magnet and the opposed yoke are opposed to each other, and the driving coil is disposed between them.

The actuator arm 155 is held by not-shown ball bearings, for example. The ball bearings are, for example, provided at two positions, the top and bottom, of a bearing portion 157. The actuator arm 155 can rotationally slide freely by means of the voice coil motor 156. Consequently, the magnetic head can be moved to an arbitrary position on the recording medium disk 180.

FIG. 9A illustrates the configuration of part of the magnetic recording and reproducing apparatus, and is an enlarged perspective view of a head stack assembly 160.

FIG. 9B is a perspective view illustrating a magnetic head assembly (head gimbal assembly; HGA) 158 that is part of the head stack assembly 160.

As shown in FIG. 9A, the head stack assembly 160 includes the bearing portion 157, the head gimbal assembly 158, and a support frame 161. The head gimbal assembly 158 extends from the bearing portion 157. The support frame 161 extends from the bearing portion 157 in the opposite direction to the HGA. The support frame 161 supports the coil 162 of the voice coil motor.

As shown in FIG. 9B, the head gimbal assembly 158 includes the actuator arm 155 and the suspension 154. The actuator arm 155 extends from the bearing portion 157. The suspension 154 extends from the actuator arm 155.

The head slider 3 is provided at the tip of the suspension 154. The magnetic head according to the embodiment or a modification thereof is mounted in the head slider 3.

That is, the magnetic head assembly (head gimbal assembly) 158 according to the embodiment includes the magnetic head according to the embodiment, the head slider 3 mounted with the magnetic head, the suspension 154 mounted with the head slider 3 at one end, and the actuator arm 155 connected to the other end of the suspension 154.

The suspension 154 includes lead wires (not shown) for writing and reading signals, for a heater for adjusting the flying height, and for other purposes. These lead wires and the respective electrodes of the magnetic head incorporated in the head slider 3 are electrically connected.

A signal processing unit 190 is provided that uses the magnetic head to perform the writing and reading of signals on the magnetic recording medium.

The signal processing unit 190 is provided on the back side, in the drawing, of the magnetic recording and reproducing apparatus 150 illustrated in FIG. 8, for example. The input/output lines of the signal processing unit 190 are connected to the electrode pads of the head gimbal assembly 158 to be electrically connected to the magnetic head.

That is, the signal processing unit 190 is electrically connected to the magnetic head.

The change in the resistance of the stacked body 20 of the magnetic head in accordance with the medium magnetic field recorded in the magnetic recording medium 80 is detected by, for example, the signal processing unit 190.

Thus, the magnetic recording and reproducing apparatus 150 according to the embodiment includes the magnetic recording medium, the magnetic head according to the embodiment mentioned above, a movable unit that allows the magnetic recording medium and the magnetic head to move relatively in a state of keeping both apart or in contact, a position control unit that positions the magnetic head at a prescribed recording position on the magnetic recording medium, and the signal processing unit that uses the magnetic head to perform the writing and reading of signals on the magnetic recording medium.

That is, the recording medium disk 180 is used as the magnetic recording medium 80 mentioned above. The movable unit mentioned above may include the head slider 3.

The position control unit mentioned above may include the head gimbal assembly 158.

Thus, the magnetic recording and reproducing apparatus 150 according to the embodiment includes the magnetic recording medium, the magnetic head assembly according to the embodiment, and the signal processing unit 190 that uses the magnetic head mounted on the magnetic head assembly to perform the writing and reading of signals on the magnetic recording medium.

By the magnetic recording and reproducing apparatus 150 according to the embodiment, stabilized reproduction can be performed by using the magnetic head according to the embodiment mentioned above.

The embodiment provides a magneto-resistance effect element, a magnetic head, a magnetic head assembly, and a magnetic recording and reproducing apparatus that are stabilized and a method for manufacturing a magnetic head that is stabilized.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may appropriately select specific configurations of components of magnetic heads such as reproducing units, stacked bodies, first ferromagnetic layers, second ferromagnetic layers, nonmagnetic intermediate layers, under-layers, cap layers, side shield layers, magnetic layers, shield guide layers, nonmagnetic layers, insulating layers, first shields, second shields, and writing units, components of magnetic head assemblies such as head sliders, suspensions, and actuator arms, and components of magnetic recording and reproducing apparatuses such as magnetic recording media from known art and similarly practice the invention. Such practice is included in the scope of the invention to the extent that similar effects thereto are obtained. For example, also the materials, compositions, film thicknesses, etc. described in the above embodiments are only an example and various selections are possible.

Further, any two or more components of the specific examples may be combined within the extent of technical feasibility and are included in the scope of the embodiments to the extent that the spirit of the embodiments is included.

Moreover, all a magneto-resistance effect element, a magnetic head, a magnetic head assembly, a magnetic recording and reproducing apparatus, and a method for manufacturing magneto-resistance effect element practicable by an appropriate design modification by one skilled in the art based on the magneto-resistance effect element, the magnetic head, the magnetic head assembly, the magnetic recording and reproducing apparatus, and the method for manufacturing magneto-resistance effect element described above as embodiments of the invention also are within the scope of the invention to the extent that the purport of the embodiments of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magneto-resistance effect element comprising:
   a first shield;
   a second shield;
   a first side shield layer including:
     a first magnetic layer provided between the first shield and the second shield;
     a first nonmagnetic intermediate layer provided between the first magnetic layer and the second shield; and
     a second magnetic layer provided between the first nonmagnetic intermediate layer and the second shield and antiferromagnetically coupled to the first magnetic layer;
   a second side shield layer including:
     a third magnetic layer provided between the first shield and the second shield and away from the first side shield layer in a first direction intersecting with a stacking direction from the first shield toward the second shield;
     a second nonmagnetic intermediate layer provided between the third magnetic layer and the second shield and away from the first side shield layer in the first direction; and
     a fourth magnetic layer provided between the second nonmagnetic intermediate layer and the second shield and away from the first side shield layer in the first direction and antiferromagnetically coupled to the third magnetic layer;
   a stacked body including:
     a first ferromagnetic layer provided between the first side shield layer and the second side shield layer between the first shield and the second shield;
     a third nonmagnetic intermediate layer provided between the first ferromagnetic layer and the second shield; and
     a second ferromagnetic layer provided between the third nonmagnetic intermediate layer and the second shield;
   a first shield guide layer including a fifth magnetic layer provided between the first side shield layer and the stacked body; and
   a second shield guide layer including a sixth magnetic layer provided between the second side shield layer and the stacked body,
   a distance between the first side shield layer and the first shield guide layer being shorter than a distance between the stacked body and the first shield guide layer,
   a distance between the second side shield layer and the second shield guide layer being shorter than a distance between the stacked body and the second shield guide layer.

2. The element according to claim 1, wherein
the first shield guide layer extends to between the first shield and the first side shield layer and
the second shield guide layer extends to between the first shield and the second side shield layer.

3. The element according to claim 1, wherein
the first shield guide layer further includes a first nonmagnetic layer provided between the first side shield layer and the fifth magnetic layer and
the second shield guide layer further includes a second nonmagnetic layer provided between the second side shield layer and the sixth magnetic layer.

4. The element according to claim 3, wherein
the first nonmagnetic layer is provided in contact with the first side shield layer and
the second nonmagnetic layer is provided in contact with the second side shield layer.

5. The element according to claim 3, wherein
a thickness in the first direction of the first nonmagnetic layer is 5 nanometers or less and
a thickness in the first direction of the second nonmagnetic layer is 5 nanometers or less.

6. The element according to claim 1, further comprising:
a first insulating layer provided between the first shield guide layer and the stacked body; and
a second insulating layer provided between the second shield guide layer and the stacked body.

7. The element according to claim 6, wherein
the first insulating layer extends to between the first shield and the first shield guide layer and
the second insulating layer extends to between the first shield and the second shield guide layer.

8. The element according to claim 1, further comprising:
a first insulating layer provided between the first shield guide layer and the stacked body; and
a second insulating layer provided between the second shield guide layer and the stacked body, the first shield guide layer further including a first nonmagnetic layer provided between the first side shield layer and the fifth magnetic layer, the second shield guide layer further including a second nonmagnetic layer provided between the second side shield layer and the sixth magnetic layer.

9. The element according to claim 1, wherein
the first shield guide layer is provided in contact with the first side shield layer and
the second shield guide layer is provided in contact with the second side shield layer.

10. The element according to claim 1, further comprising a cap layer provided between the second ferromagnetic layer and the second shield.

11. The element according to claim 1, wherein
a thickness in the first direction of the fifth magnetic layer is not less than 1 nanometer and not more than 5 nanometers and
a thickness in the first direction of the sixth magnetic layer is not less than 1 nanometer and not more than 5 nanometers.

12. A magnetic head comprising:
a magneto-resistance effect element including:
a first shield;
a second shield;
a first side shield layer including:
a first magnetic layer provided between the first shield and the second shield;
a first nonmagnetic intermediate layer provided between the first magnetic layer and the second shield; and
a second magnetic layer provided between the first nonmagnetic intermediate layer and the second shield and antiferromagnetically coupled to the first magnetic layer;
a second side shield layer including:
a third magnetic layer provided between the first shield and the second shield and away from the first side shield layer in a first direction intersecting with a stacking direction from the first shield toward the second shield;
a second nonmagnetic intermediate layer provided between the third magnetic layer and the second shield and away from the first side shield layer in the first direction; and
a fourth magnetic layer provided between the second nonmagnetic intermediate layer and the second shield and away from the first side shield layer in the first direction and antiferromagnetically coupled to the third magnetic layer;
a stacked body including:
a first ferromagnetic layer provided between the first side shield layer and the second side shield layer between the first shield and the second shield;
a third nonmagnetic intermediate layer provided between the first ferromagnetic layer and the second shield; and
a second ferromagnetic layer provided between the third nonmagnetic intermediate layer and the second shield;
a first shield guide layer including a fifth magnetic layer provided between the first side shield layer and the stacked body; and
a second shield guide layer including a sixth magnetic layer provided between the second side shield layer and the stacked body,
a distance between the first side shield layer and the first shield guide layer being shorter than a distance between the stacked body and the first shield guide layer,
a distance between the second side shield layer and the second shield guide layer being shorter than a distance between the stacked body and the second shield guide layer.

13. A magnetic head assembly comprising:
a magnetic head;
a suspension mounted with the magnetic head at one end; and
an actuator arm connected to another end of the suspension,
the magnetic head including:
a magneto-resistance effect element including:
a first shield;
a second shield;
a first side shield layer including:
a first magnetic layer provided between the first shield and the second shield;
a first nonmagnetic intermediate layer provided between the first magnetic layer and the second shield; and
a second magnetic layer provided between the first nonmagnetic intermediate layer and the second shield and antiferromagnetically coupled to the first magnetic layer;
a second side shield layer including:
a third magnetic layer provided between the first shield and the second shield and away from the first side shield layer in a first direction intersecting with a stacking direction from the first shield toward the second shield;
a second nonmagnetic intermediate layer provided between the third magnetic layer and the second shield and away from the first side shield layer in the first direction; and
a fourth magnetic layer provided between the second nonmagnetic intermediate layer and the second shield and away from the first side shield layer in the first direction and antiferromagnetically coupled to the third magnetic layer;
a stacked body including:
a first ferromagnetic layer provided between the first side shield layer and the second side shield layer between the first shield and the second shield;
a third nonmagnetic intermediate layer provided between the first ferromagnetic layer and the second shield; and
a second ferromagnetic layer provided between the third nonmagnetic intermediate layer and the second shield;
a first shield guide layer including a fifth magnetic layer provided between the first side shield layer and the stacked body; and
a second shield guide layer including a sixth magnetic layer provided between the second side shield layer and the stacked body,
a distance between the first side shield layer and the first shield guide layer being shorter than a distance between the stacked body and the first shield guide layer,
a distance between the second side shield layer and the second shield guide layer being shorter than a distance between the stacked body and the second shield guide layer.

14. A magnetic recording and reproducing apparatus comprising:
- a magnetic head assembly; and
- a magnetic recording medium from which information is reproduced using a magnetic head mounted on the magnetic head assembly,
- the magnetic head assembly including:
  - a magnetic head;
  - a suspension mounted with the magnetic head at one end; and
  - an actuator arm connected to another end of the suspension,
- the magnetic head including:
  - a magneto-resistance effect element including:
    - a first shield;
    - a second shield;
    - a first side shield layer including:
      - a first magnetic layer provided between the first shield and the second shield;
      - a first nonmagnetic intermediate layer provided between the first magnetic layer and the second shield; and
      - a second magnetic layer provided between the first nonmagnetic intermediate layer and the second shield and antiferromagnetically coupled to the first magnetic layer;
    - a second side shield layer including:
      - a third magnetic layer provided between the first shield and the second shield and away from the first side shield layer in a first direction intersecting with a stacking direction from the first shield toward the second shield;
      - a second nonmagnetic intermediate layer provided between the third magnetic layer and the second shield and away from the first side shield layer in the first direction; and
      - a fourth magnetic layer provided between the second nonmagnetic intermediate layer and the second shield and away from the first side shield layer in the first direction and antiferromagnetically coupled to the third magnetic layer;
    - a stacked body including:
      - a first ferromagnetic layer provided between the first side shield layer and the second side shield layer between the first shield and the second shield;
      - a third nonmagnetic intermediate layer provided between the first ferromagnetic layer and the second shield; and
      - a second ferromagnetic layer provided between the third nonmagnetic intermediate layer and the second shield;
    - a first shield guide layer including a fifth magnetic layer provided between the first side shield layer and the stacked body; and
    - a second shield guide layer including a sixth magnetic layer provided between the second side shield layer and the stacked body,
    - a distance between the first side shield layer and the first shield guide layer being shorter than a distance between the stacked body and the first shield guide layer,
    - a distance between the second side shield layer and the second shield guide layer being shorter than a distance between the stacked body and the second shield guide layer.

15. A method for manufacturing a magneto-resistance effect element comprising:
- a stacking process of forming a first ferromagnetic film on a first shield, forming a third nonmagnetic intermediate film on the first ferromagnetic film, and forming a second ferromagnetic film on the third nonmagnetic intermediate film;
- a patterning process of patterning the first ferromagnetic film, the third nonmagnetic intermediate film, and the second ferromagnetic film to form a stacked body including a first ferromagnetic layer, a third nonmagnetic intermediate layer, and a second ferromagnetic layer;
- a first insulating layer formation process of forming a first insulating layer in contact with the first shield and the stacked body on the first shield;
- a second insulating layer formation process of forming a second insulating layer in contact with the first shield and the stacked body on the first shield and away from the first insulating layer in a first direction intersecting with a stacking direction from the first shield toward the second ferromagnetic layer;
- a first shield guide layer formation process of forming a fifth magnetic layer on the first insulating layer;
- a second shield guide layer formation process of forming a sixth magnetic layer on the second insulating layer;
- a first side shield layer formation process of forming a first magnetic layer on the fifth magnetic layer, with a distance between the first magnetic layer and the fifth magnetic layer set shorter than a distance between the stacked body and the fifth magnetic layer, forming a first nonmagnetic intermediate layer on the first magnetic layer, with a distance between the first nonmagnetic intermediate layer and the fifth magnetic layer set shorter than a distance between the stacked body and the fifth magnetic layer, and forming a second magnetic layer antiferromagnetically coupled to the first magnetic layer on the first nonmagnetic intermediate layer, with a distance between the second magnetic layer and the fifth magnetic layer set shorter than a distance between the stacked body and the fifth magnetic layer;
- a second side shield layer formation process of forming a third magnetic layer on the sixth magnetic layer, with a distance between the third magnetic layer and the sixth magnetic layer set shorter than a distance between the stacked body and the sixth magnetic layer, forming a second nonmagnetic intermediate layer on the third magnetic layer, with a distance between the second nonmagnetic intermediate layer and the sixth magnetic layer set shorter than a distance between the stacked body and the sixth magnetic layer, and forming a fourth magnetic layer antiferromagnetically coupled to the third magnetic layer on the second nonmagnetic intermediate layer, with a distance between the fourth magnetic layer and the sixth magnetic layer shorter than a distance between the stacked body and the sixth magnetic layer; and
- a second shield formation process of forming a second shield directly on the stacked body.

16. The method according to claim 15, wherein
the first side shield layer formation process includes forming the first magnetic layer in contact with the fifth magnetic layer, forming the first nonmagnetic intermediate layer in contact with the fifth magnetic layer, and forming the second magnetic layer in contact with the fifth magnetic layer and
the second side shield layer formation process includes forming the third magnetic layer in contact with the sixth magnetic layer, forming the second nonmagnetic intermediate layer in contact with the sixth magnetic layer, and forming the fourth magnetic layer in contact with the sixth magnetic layer.

17. The method according to claim 15, wherein
the first shield guide layer formation process includes forming a first nonmagnetic layer on the fifth magnetic layer and
the second shield guide layer formation process includes forming a second nonmagnetic layer on the sixth magnetic layer.

18. The method according to claim 17, wherein
the first side shield layer formation process includes forming the first magnetic layer in contact with the first nonmagnetic layer, forming the first nonmagnetic intermediate layer in contact with the first nonmagnetic layer, and forming the second magnetic layer in contact with the first nonmagnetic layer and
the second side shield layer formation process includes forming the third magnetic layer in contact with the second nonmagnetic layer, forming the second nonmagnetic intermediate layer in contact with the second nonmagnetic layer, and forming the fourth magnetic layer in contact with the second nonmagnetic layer.

19. The method according to claim 15, wherein
the stacking process includes forming a cap film on the second ferromagnetic film and
the patterning process includes patterning the cap film to form the stacked body including a cap layer.

20. The method according to claim 19, wherein the stacking process is performed in a continuous reduced pressure environment without passing through atmospheric pressure.

* * * * *